Figure 1:
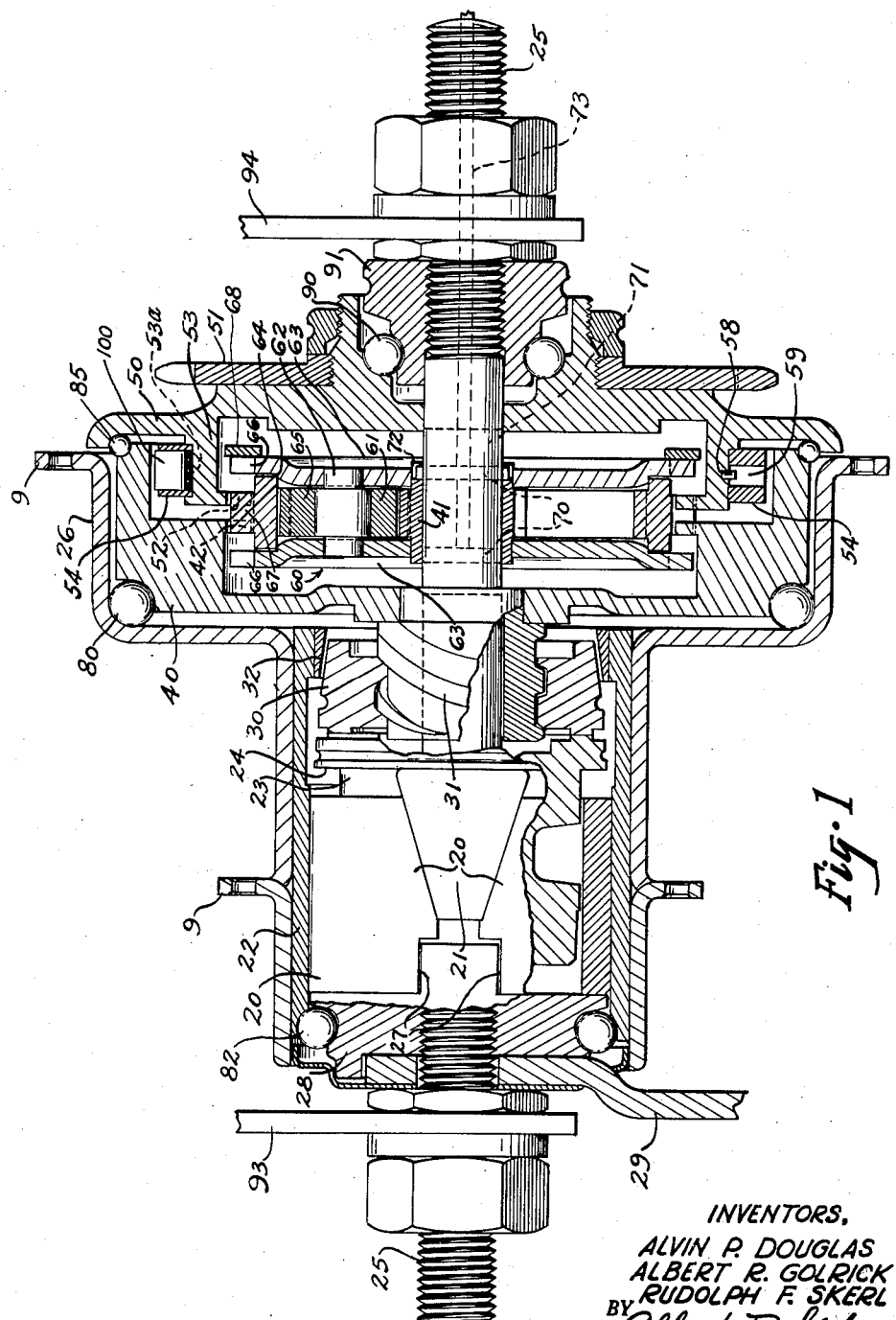

Aug. 11, 1959 — A. P. DOUGLAS ET AL — 2,899,030
THREE SPEED BICYCLE TRANSMISSION
Filed Jan. 25, 1954 — 10 Sheets-Sheet 1

INVENTORS.
ALVIN P. DOUGLAS
ALBERT R. GOLRICK
RUDOLPH F. SKERL
BY Albert R. Golrick
ATTORNEY INVENTORS,
ALVIN P. DOUGLAS
ALBERT R. GOLRICK
RUDOLPH F. SKERL
BY Albert R. Golrick
ATTORNEY

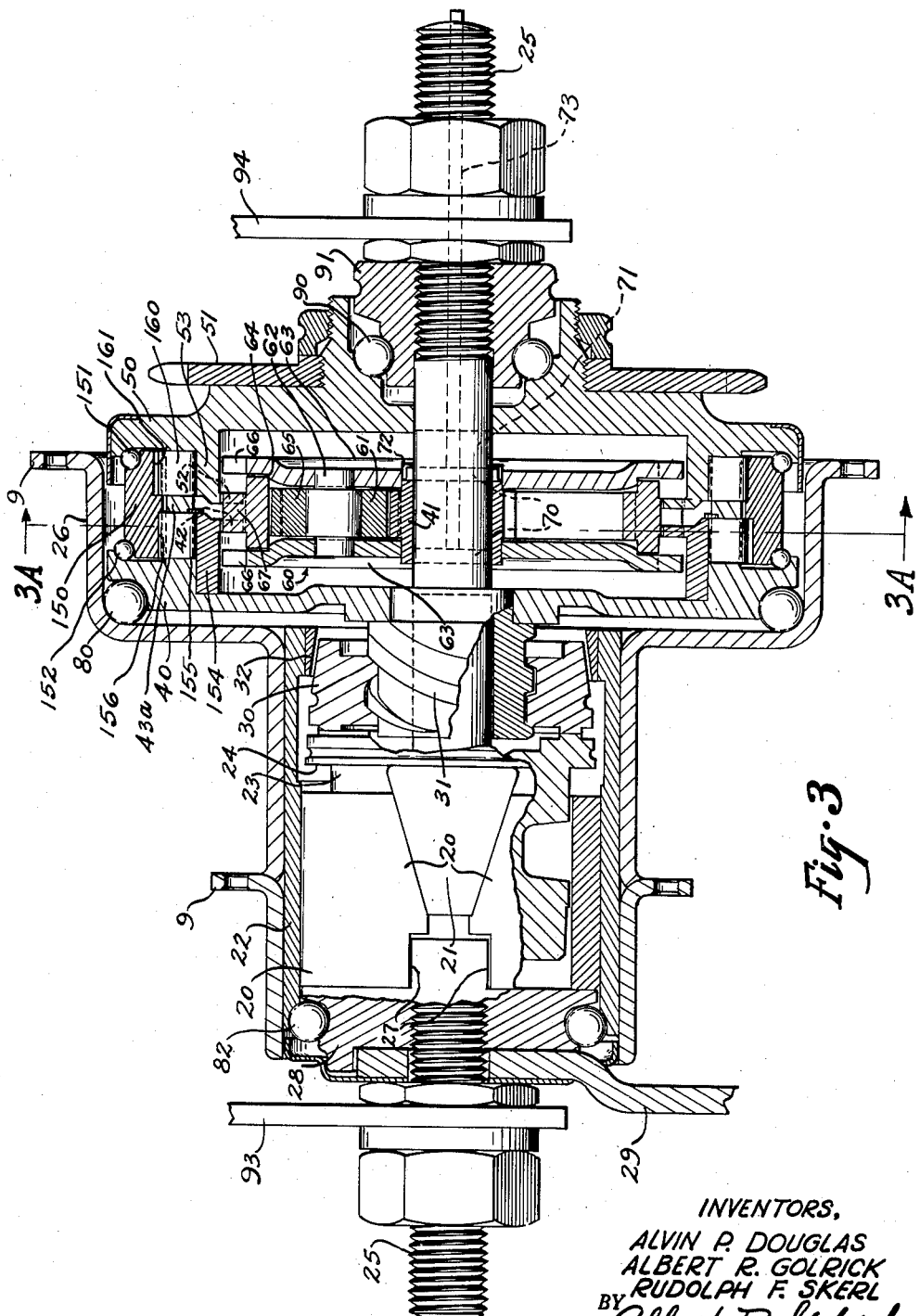

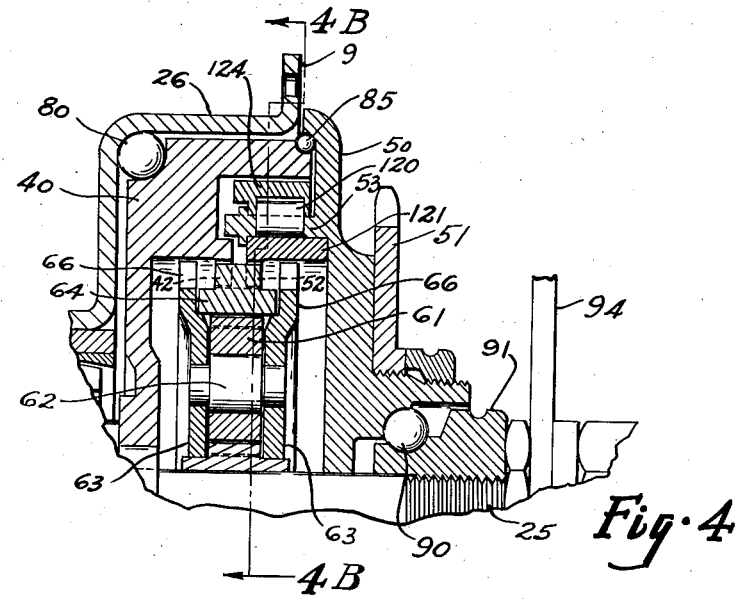
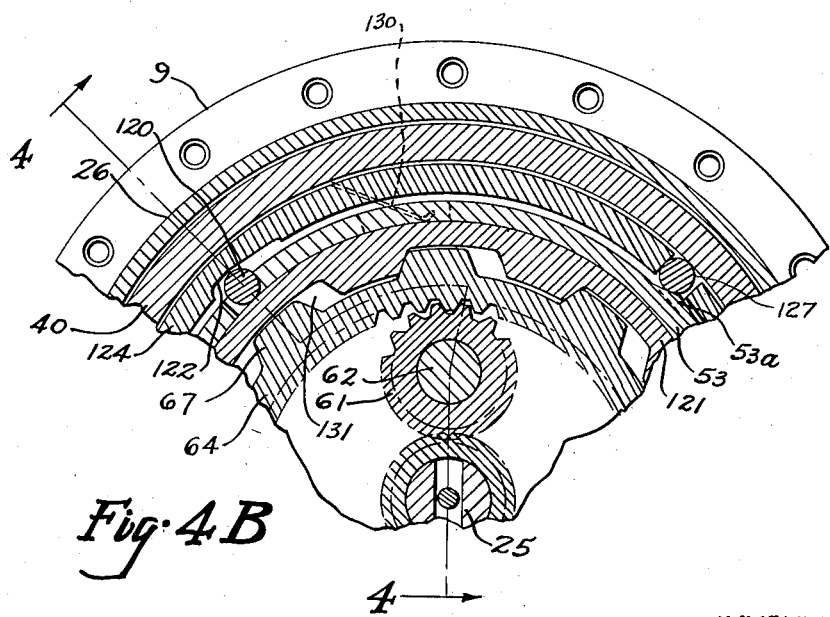

INVENTORS,
ALVIN P. DOUGLAS
ALBERT R. GOLRICK
RUDOLPH F. SKERL
BY
Albert R. Golrick
ATTORNEY Aug. 11, 1959     A. P. DOUGLAS ET AL     2,899,030
THREE SPEED BICYCLE TRANSMISSION
Filed Jan. 25, 1954                          10 Sheets-Sheet 6

INVENTORS,
ALVIN P. DOUGLAS
ALBERT R. GOLRICK
RUDOLPH F. SKERL
BY *Albert R. Golrick*
ATTORNEY Aug. 11, 1959 A. P. DOUGLAS ET AL 2,899,030
THREE SPEED BICYCLE TRANSMISSION
Filed Jan. 25, 1954 10 Sheets-Sheet 7

INVENTORS,
ALVIN P. DOUGLAS
ALBERT R. GOLRICK
RUDOLPH F. SKERL
BY
Albert R. Golrick
ATTORNEY INVENTORS,
ALVIN P. DOUGLAS
ALBERT R. GOLRICK
RUDOLPH F. SKERL
BY
*Albert R. Golrick*
ATTORNEY Aug. 11, 1959     A. P. DOUGLAS ET AL     2,899,030
THREE SPEED BICYCLE TRANSMISSION
Filed Jan. 25, 1954     10 Sheets-Sheet 9

INVENTORS,
ALVIN P. DOUGLAS
ALBERT R. GOLRICK
RUDOLPH F. SKERL
BY
Albert R. Golrick
ATTORNEY Aug. 11, 1959     A. P. DOUGLAS ET AL     2,899,030
THREE SPEED BICYCLE TRANSMISSION
Filed Jan. 25, 1954     10 Sheets-Sheet 10

INVENTORS,
ALVIN P. DOUGLAS
ALBERT R. GOLRICK
RUDOLPH F. SKERL
BY
Albert R. Golrick
ATTORNEY United States Patent Office 2,899,030
Patented Aug. 11, 1959

2,899,030

THREE SPEED BICYCLE TRANSMISSION

Alvin P. Douglas and Albert R. Golrick, Cleveland Heights, and Rudolph F. Skerl, Euclid, Ohio, assignors to The Murray Ohio Manufacturing Company, Cleveland, Ohio, a corporation of Ohio Application January 25, 1954, Serial No. 405,968

52 Claims. (Cl. 192—6)

This invention is concerned with speed change transmission mechanisms and more particularly with three speed bicycle transmissions combined with braking mechanisms, the general object hereof being the provision of a combined coaster brake and speed change mechanism of durable construction.

A more specific object of the invention is the provision of a novel arrangement of a three speed change gear type of bicycle transmission and a coaster brake mechanism whereby the braking torque effort exerted by the rider upon the pedals and sprockets of the bicycle will be transmitted to the brake mechanism without the braking effort being transmitted through the gear members of the transmission.

Another object is the provision of a bicycle change gear transmission unit which can be combined with a rear bicycle wheel to constitute a conversion unit whereby a standard bicycle may be converted to a three speed bicycle replacing the rear wheel, the arrangement being such that the overall axial dimensions of the conversion unit will not exceed the inherent spreading capacity of the rear fork structures of conventional bicycle frames.

Another object of the present invention is the provision of a three speed bicycle transmission of the planetary gear type which may be combined with a braking mechanism in such manner that the braking mechanism can be operated in the conventional manner of reversing the pedal pressure regardless of the speed change setting of the transmission gears and whereby the braking effort exerted will always be the same regardless of the speed change setting of the transmission.

More specifically an object of the present invention is the provision of a novel manner of coupling the driving element to the driven element of a shiftable planetary gear system upon a reversal of the driving effort of the driving member without necessitating a change in the setting of the gearing.

The present invention contemplates the utilization of an axially shiftable planetary gear cage upon the rear axle of a bicycle, the gear train comprising a non-rotatable sun gear, planets and a ring gear. The ring gear and the perimeters of the cage structure are of the same diameter and are provided with clutch teeth adapted to selectively engage clutch teeth formed on the driving member (sprocket driven member) and the driven member. Generally such an axially shiftable change speed gear mechanism is disclosed in the prior art and the present invention is directed to the solution of practical problems involved in adapting such a transmission to the rear axles and wheels of bicycles.

Among the problems in the adaptation of such a transmission to the conventional habits of the bicycle rider is that brought about by the sudden violent use of the braking mechanism by standing on the bicycle pedals. From an engineering viewpoint to meet such a common occurrence of usage, keys, axles and gear teeth take on such a heavy design that the overall bulk of the gear mechanism and hub structure results in prohibitive dimensional and weight increases of the involved elements, since the required axle diameter determines the design diameters of the sun gear, while in turn the pitch diameter of the sun gear predetermines the overall diameter of the ring gear, the cage structure, the driving and the driven members and the involved bearing requirements for these elements.

We have discovered that by automatically clutching the driving element directly to the driven element upon a reverse braking movement of the driving element, all braking stresses upon the gear train can be avoided, and accordingly that the tooth pitch of the gears, the key sizes and the sizes of the cage, the driving and driven members and the gear diameters can be maintained within practical design limits, including the axial limits of the inherent spring spread of the rear fork structures of conventional bicycle frames. As will be seen hereinafter, this frame spreading practically can be eliminated by use of the conversion units herein disclosed.

In the drawings, among which like numbers are used to designate like elements—

Figure 2:
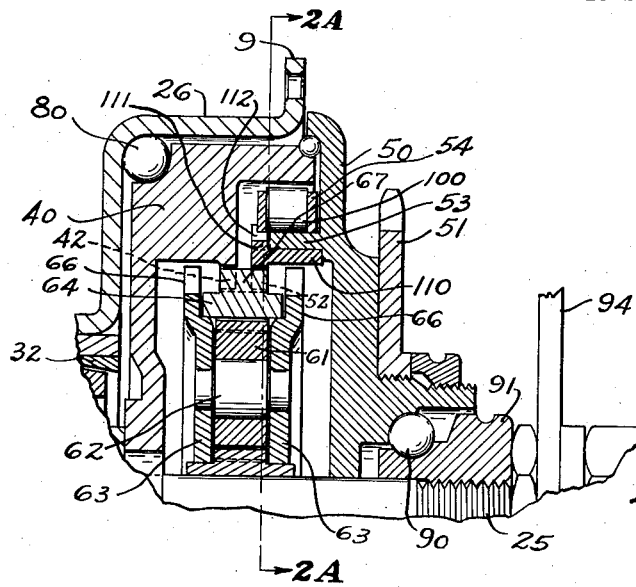
Figure 2A:
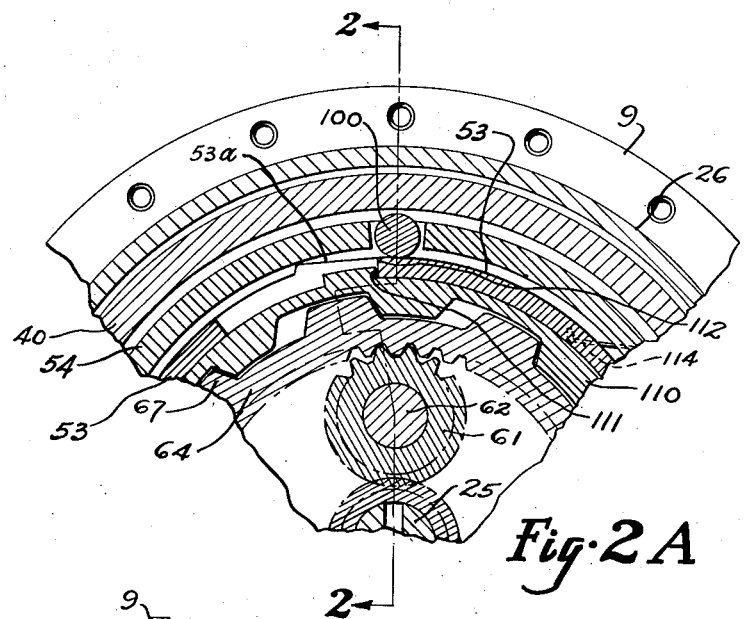
Figure 1A:
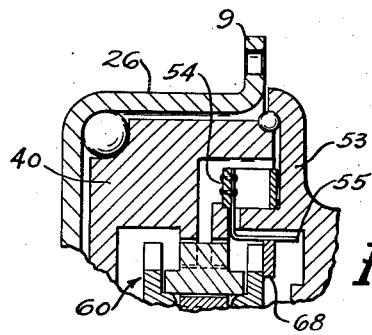
Figure 3A:
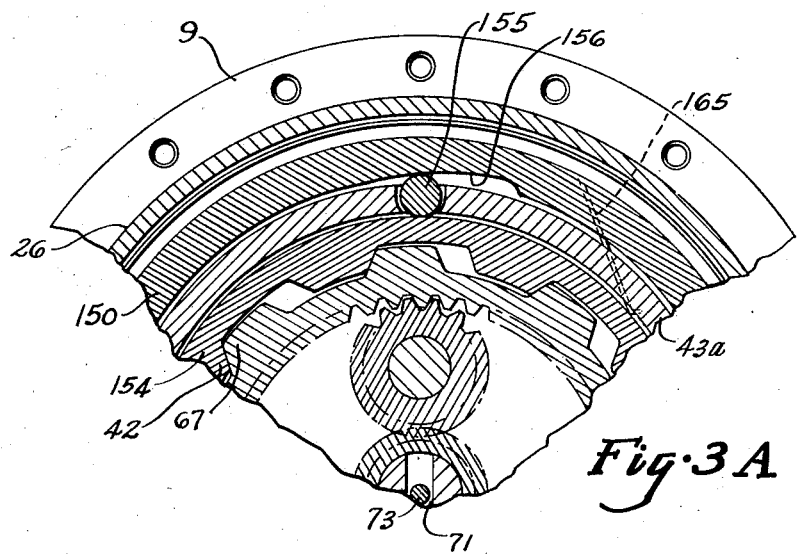
Figure 4A:
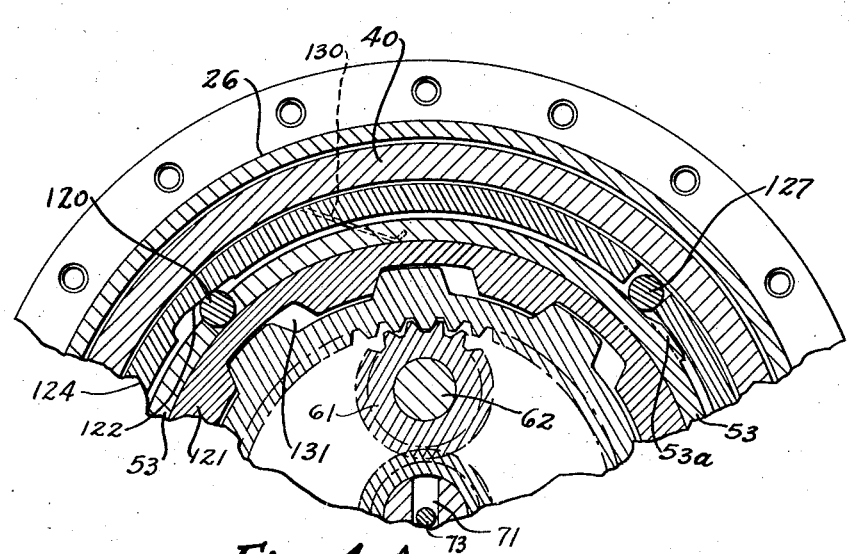
Figure 5:
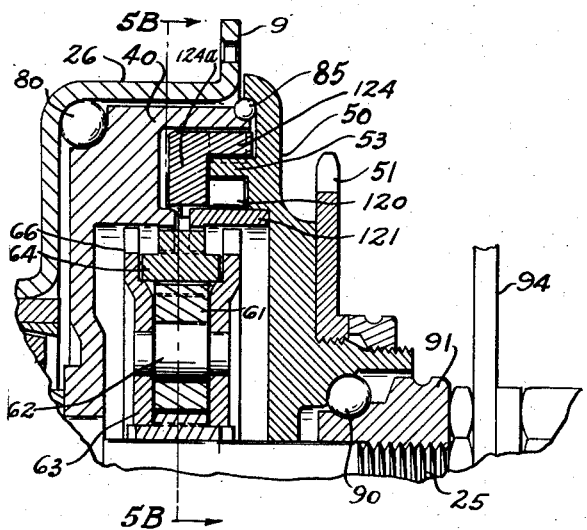
Figure 5A:
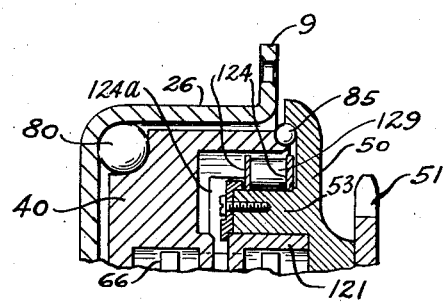
Figure 5B:
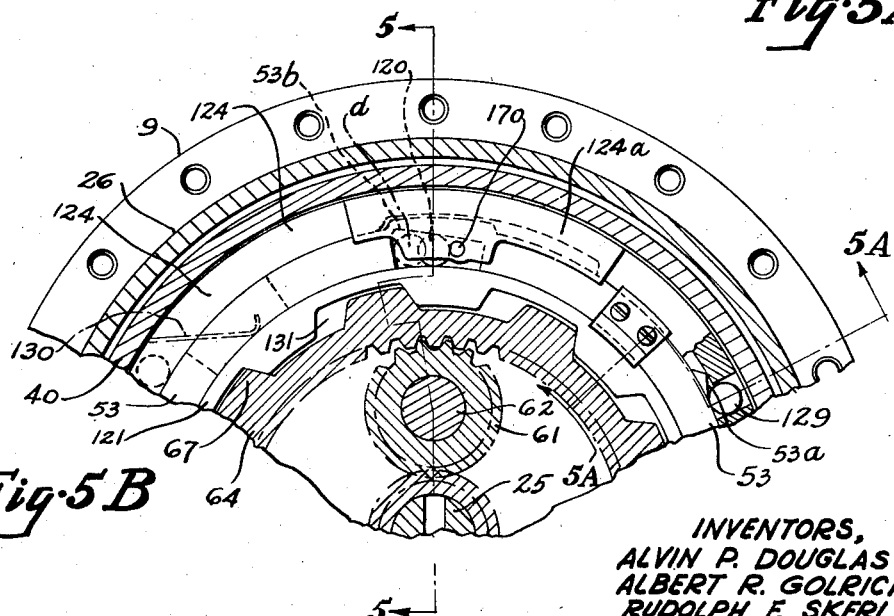
Figure 6:
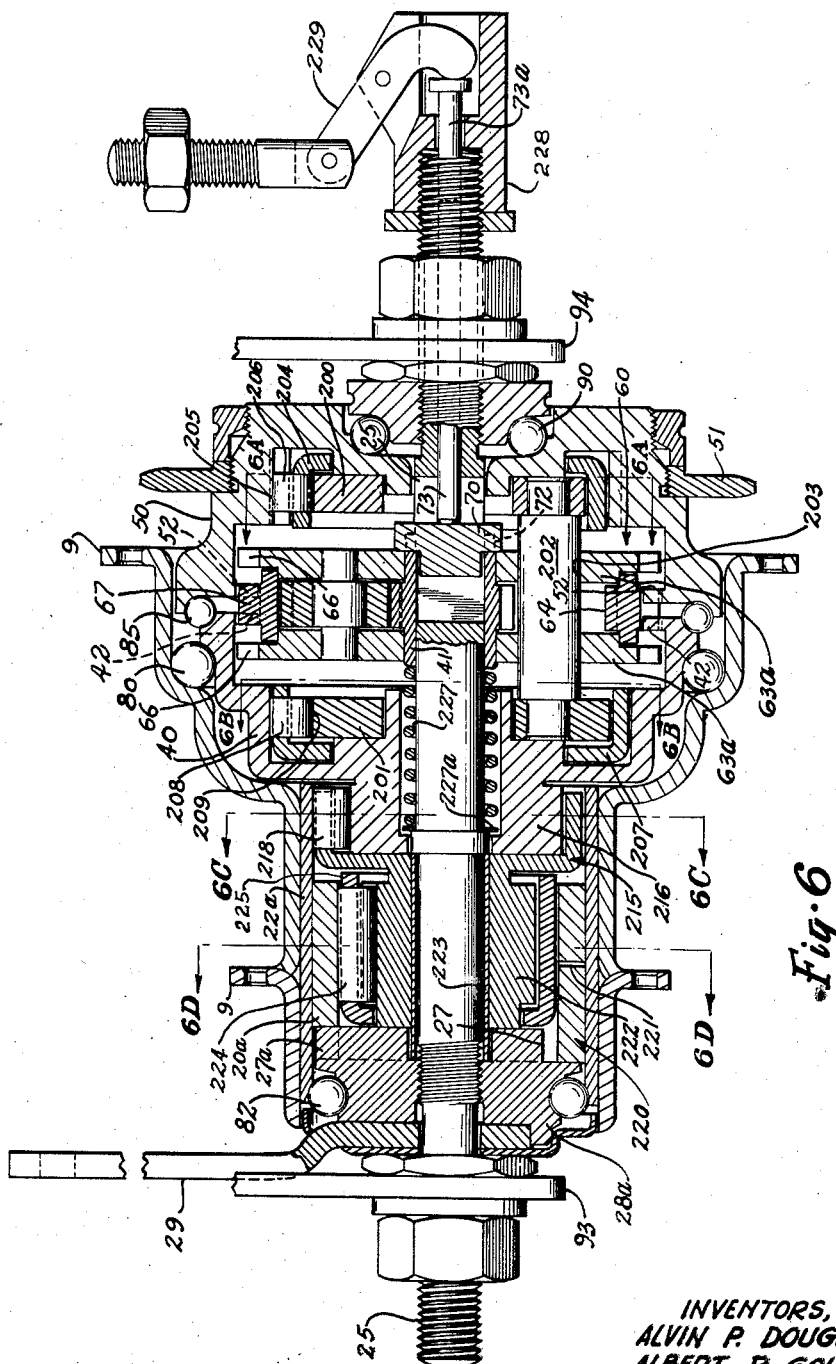
Figure 6A:
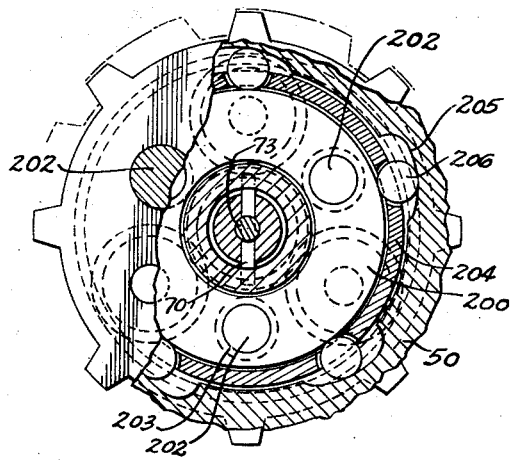
Figure 6B:
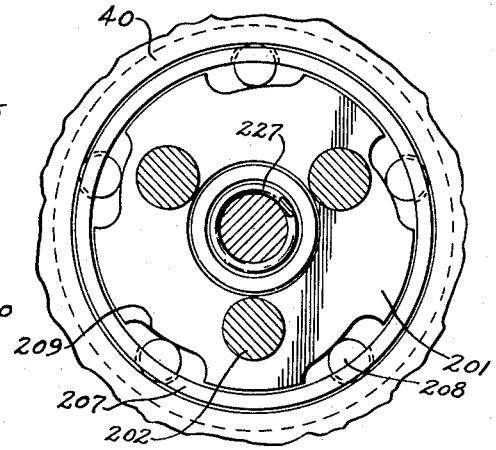
Figure 6C:
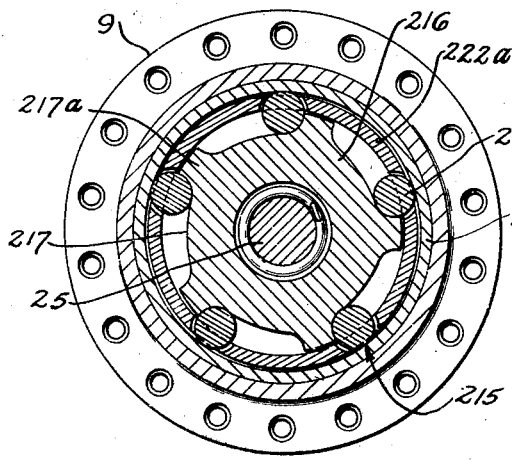
Figure 6D:
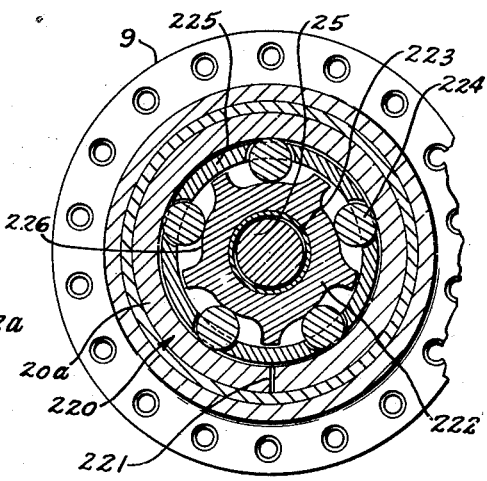
Figure 7:
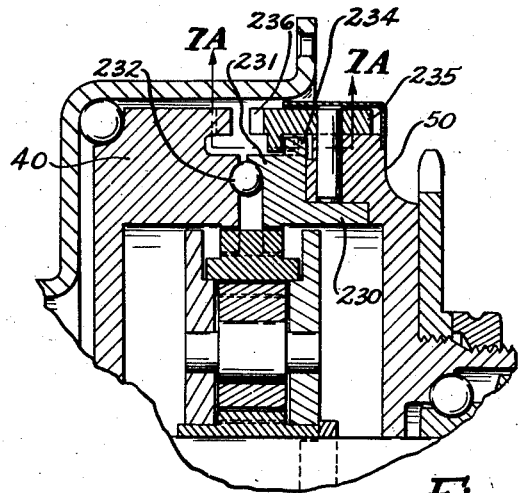
Figure 7A:
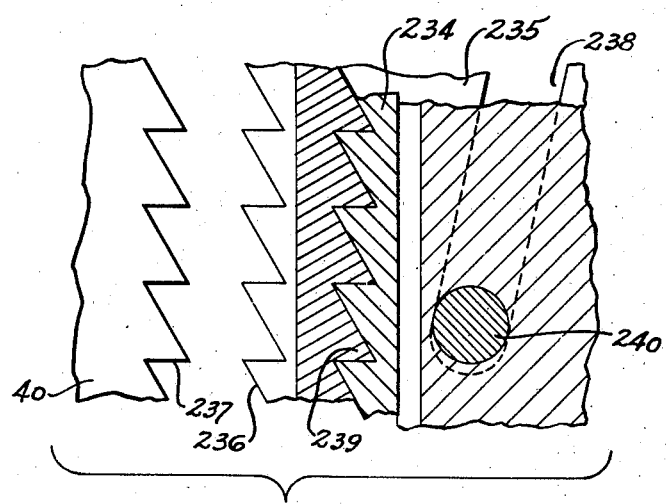
Figure 8:
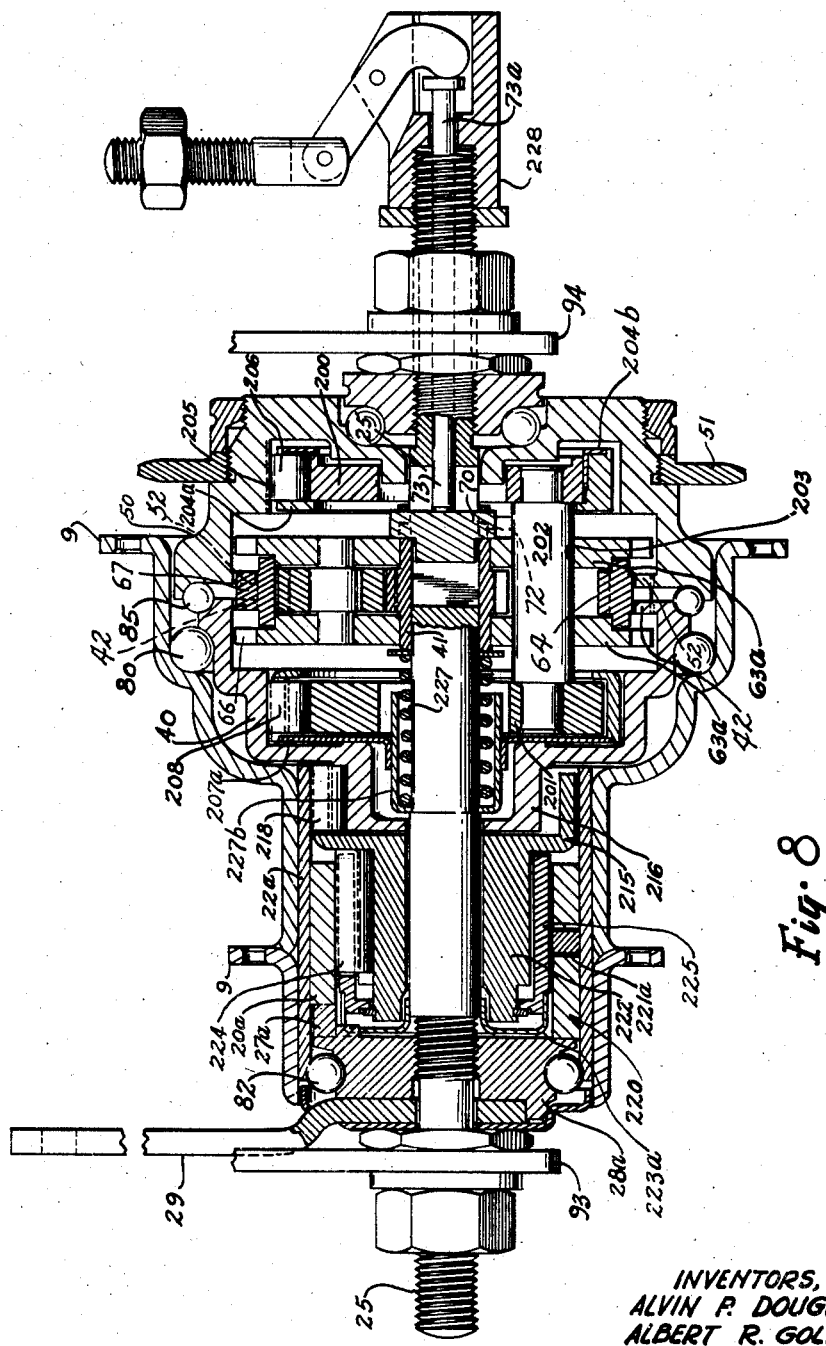

Fig. 1 is a sectional view of a speed-change bicycle transmission mechanism embodying one form of our invention, the section being taken substantially axially of the rear wheel mounting of a bicycle;

Fig. 1–A is a fragmentary sectional view of the mechanism shown in Fig. 1, the section being taken at an axial plane different from that of Fig. 1 to show details not apparent in Fig. 1;

Fig. 2 is a fragmentary axial section of a device generally similar to that of Fig. 1, but showing a modification in certain clutching elements;

Fig. 2–A is a fragmentary radial section taken along the line 2A—2A in Fig. 2;

Fig. 3 is a sectional view taken similarly to Fig. 1, but showing a different embodiment of the invention;

Fig. 3–A is a fragmentary sectional view taken along the line 3A—3A in Fig. 3;

Fig. 4 is a fragmentary axial sectional view, similar to Fig. 2, but showing a modification;

Fig. 4–B is a fragmentary radial section taken substantially along the line 4B—4B of Fig. 4 and showing the relation of certain elements for the reverse, i.e. braking, position;

Fig. 4–A, similar to Fig. 4–B, shows forward drive relations;

Fig. 5 is also a fragmentary axial section of another modification of the mechanism, the section being taken as indicated by line 5—5 in Fig. 5–B;

Fig. 5–A is a fragmentary axial section of the mechanism of Fig. 5 taken along the line 5A—5A in Fig. 5–B;

Fig. 5–B is a fragmentary section taken as indicated by the line 5B—5B in Fig. 5;

Fig. 6 is an axial section of a device embodying a brake mechanism different from that shown in Fig. 1, as well as modifications of the transmission mechanism itself;

Figs. 6–A, 6–B, are fragmentary radial sections taken respectively along the lines 6A—6A and 6B—6B in Fig. 6;

Figs. 6–C, 6–D are radial sections taken respectively along the lines 6C—6C and 6D—6D in Fig. 6;

Fig. 7 is a fragmentary axial section of another form of the invention;

Fig. 7–A is a fragmentary detail section taken as indicated by line 7A—7A in Fig. 7; and Fig. 8 is a modification of Fig. 6.

In Fig. 1 of the drawings we have shown in axial cross section a complete assembly of the transmission and the coaster brake mechanisms embodied in a rear wheel hub structure as being mounted upon the bicycle rear forks.

The essential elements of the coaster brake mechanism are well known and comprise an expandable brake shoe 20 which is expanded by an axially shiftable wedge member 21 against the inner surface of the hub structure 22. A barrel member 23 on the axle 25 is shaped to support radially the brake shoe 20 in a well known manner with a shoulder 24 thereof thrusting against the inner base end of the wedge 21. The brake shoe is notched at one end to loosely engage shoulders 27 on a bearing member 28 threadably mounted on the shaft 25. The bearing member 28 constitutes a torque transferring member having the outer end recessed and slotted to receive and engage a torque arm 29 disposed externally of the hub structure and fixed to a lower rear fork member of the bicycle frame, whereby to transfer the braking reactions on the shoe to the frame without passing through the rear axle. The wedge member 21 is axially shifted in braking direction by a cone clutch nut member 30 which axially thrusts against the end of the shoe supporting barrel member 23. The cone clutch member 30 is in threaded engagement with a screw element 31. When this screw element 31 is turned counterclockwise (viewed from the right) braking is effected. When the screw element is turned clockwise the conic surface of member 30 is brought into clutching engagement with the conic part 32 of the hub structure thereby to turn or drive the rear wheel.

The speed change gearing or transmission mechanism, shown as being associated immediately with the screw element 31, drives an output element or a driven member 40 welded or otherwise fixed to the screw member 31, the mechanism being driven by an input element or driving member 50 upon which the bicycle rear sprocket 51 is removably mounted. The transmission mechanism comprises a planetary system including a planetary gear carrying cage structure, generally designated by the reference numeral 60, is disposed between the driving member 50 and the driven member 40 and is journalled upon the hub ends of a sun gear 41 which is axially slideable but nonrotatable upon the axle 25. In mesh with the sun gear are planet gears 61 supported by bearing studs 62 which are fixed to and space the cage disks 63. These cage disks are formed axially outwardly to afford shoulders 64 upon which the ring gear 65 of the planetary system rides in mesh with the planets. On the perimeters of the cage disk members 63 are provided spline or clutch teeth 66; and on the outer perimeter of the ring gear are provided like clutch teeth 67, which are of the same diameter as the cage teeth 66. On the driving member 50 are provided with integrally formed clutch teeth 52; and on the driven member 40, integral like clutch teeth 42, the respective sets of teeth being adapted to engage the cage teeth 66 and ring gear teeth 67 in the following manner.

When the driving and driven teeth 52 and 42 are in engagement with the ring gear clutch teeth 67 a direct drive setting is obtained i.e. the driving member 50 is directly connected, in a transmission sense, to the driven member 40 and screw element 31.

When the cage and sun gear are shifted to the extreme left, the driving teeth 52 become engaged with the cage teeth 66 and the ring gear is connected to the driven teeth 42. This produces an overdrive (high) gear connection with the ring gear rotating faster than the planet carrier 60. The amount of this overdrive is dependent upon the tooth ratio of the sun and ring gear teeth.

When the cage and sun gear are shifted to the extreme right, the driving teeth 52 are connected to the ring gear spline or clutch teeth 67, and the driven teeth 42 are connected to the cage teeth 66. This produces an underdrive condition with the planet carrier 60 rotating slower than the ring gear. Any suitable shipper mechanism may be utilized for selectively shifting and for holding the cage and gear train in the three described positions.

We are able to increase the diameter of the rear axle while maintaining the diameters of the transmission members to low practical dimensions. This is accomplished as stated by avoiding using the sun gear and other elements of the transmission as reactive members involved in the application of the mentioned braking effort. For example, we may increase the axle diameter to 7/16 of an inch as compared to the common practice of using a coaster brake axle of 3/8 of an inch. The shipper mechanism may include two fixed together key members 70 extending diametrically through a slot 71 formed in the axle 25, the key members terminating in the end slots 72 formed in the ends of the sun gear hub portions. The axial length of the slot 71 is such as to permit selective shifting of the sun gear 41, with the planet carrier structure 60 journalled thereon, to the three mentioned axial positions. This shifting is effected by a rod 73 extending in a central axle bore outwardly to one end of the axle where it is connected to a shipper actuating mechanism (not shown).

It will be noted that the disclosed embodiment lends itself readily to suitable bearing support of the driving and driven members in that bearing 80 supports the sprocket side or end of the wheel hub structure while the other end of the hub structure is supported by the conventional bearing structure 82. The driving member is supported by a bearing structure 85 reacting between the driving member 50 and a portion of the driven member 40 (see Fig. 1) which overlaps the driving member for a direct clutching purpose to be described, and by the outer bearing structure 90 including the adjustable race member 91 threaded on the axle 25. The described structure of the driving member 50 is such that the sprocket 51 is replaceably mounted thereon to be in chain alignment with the hanger sprocket of the bicycle since it is desired frequently to manufacture bicycles with varying sprocket ratios. This arrangement is possible with a transmission of the type disclosed by having the major part of the transmission disposed within an enlargement 26 of the hub structure thereby confining the overall axial dimension of the coaster brake mechanism, the selective transmission mechanism, and the bearings therefor within the conventional distance between the rear fork clips 93 and 94 of a bicycle frame.

The combined coaster brake and change speed transmission thus far described is operable to perform its stated functions if size of the cooperating elements including the size of the hub structure can be disregarded. However if the maximum braking effort can be transmitted to the coaster brake mechanism without being transmitted through the gear train, the size of the gears and planet carrier and the pitch of the gear teeth may be of smaller dimensions thereby affording a compact design.

The direct coupling of the driving member to the driven member may be accomplished by a lost motion connection between the driving member and the gear system while clutching the driving member directly to the driven member with the driven member remaining in engagement with the gear system; or we may use a reverse instantaneously acting releasing clutch between the driven member and the gear system while the driving member remains connected to the gear system. Also a transmission releasing clutch may be used between the driving member and the transmission to obtain the desired lost motion during braking action. Hereinafter still other means of obtaining the desired result will be disclosed.

In the first mentioned arrangement, we provide a roller clutching mechanism between the driving member 50 and the driven member 40 which will serve to clutch these two members together during a reverse movement of the driving member, thus by-passing the braking effort around the gear system. To accomplish this involves a consideration of the clutched relation of the driving and driven members to the planetary gear system under all selective conditions of operation. We have found that an adverse condition will arise with respect to most proposals in that overall axial dimensions would have to be increased thereby involving an objectionable bending or excessive spreading of the rear forks of the bicycle and entailing problems of sprocket interchangeability as well as uncertainty of operation under cold weather conditions.

We have determined that a reverse roller clutch mechanism, wherein the driving member 50 constitutes the clutch roller camming member and wherein the roller cage has a friction controlled or limited lost motion relative to the movements of the driving member 50, will meet the requirements providing the control of this lost motion is obtained independently of the movements of either the driving member 50 or the driven member 40, and that it takes place during the first part of the reverse movement of the driving member.

We find that it is practical, within the confines of the major design of the transmission mechanism, to dispose clutch rollers 100 between that part of the driven member 40 which extends to the bearing 85 in overlapping relation to an annular roller camming part 53 of the driving member 50 as shown in Fig. 1. Three or four roller stations may be provided and the rollers are disposed in an annular roller cage structure 54 loosely supported by the roller camming part 53 of the driving member 50. The slope of the roller camming portions 53 of the driving member is in a direction adverse to the forward driving direction of the transmission mechanism, so that upon reverse or braking movement of the pedal crank and driving member 50 the driving and driven members become roller clutched together. At such clutching instant the driven member becomes a driving member with respect to the planetary system, and since considerable backlash has to be taken up before the screw element 31 applies the required force to the brake shoe 20, provisions must be made for a free reverse movement of the driving member relative to the ring gear and planet carrier during initial roller clutch action and during a continuation of the reverse movement of the driving member to take up the free play of the elements of the coaster brake mechanism. By limiting the number of clutch teeth 52, 66 and 67 on the driving member and carrier and ring gear, the driving teeth 52 can be reversely moved or caused rotatively to recede from the cage teeth 66 faster than the driven member teeth 42 drive the planet carrier clutch teeth in the reverse direction.

Amplifying this explanation, it has been pointed out that when the clutch teeth of the driving and driven members are in engagement with the ring gear, a direct drive results. At this middle setting of the planetary cage an advantage is obtained by roller-clutching the driving and driven members together thereby to avoid stresses on the planetary system.

When the planetary cage is shifted to the extreme left, an over-drive results. Upon braking action however the reverse of this speed relation takes place, i.e., the driven member drives the ring gear and the cage is rotated reversely at a slower speed than the driven and driving members when roller-clutched together.

When the planetary cage is shifted to the extreme right (normal under-drive condition) the driven member clutch teeth 42 are connected to the planet carrier clutch teeth 66, the ring gear clutch teeth 67 are connected to the drive clutch teeth 52, and upon reverse clutching of the driver and driven members, the teeth 52 would be driven in a reverse direction at a speed which is greater than the reverse speed of the coupled driving and driven members. To meet this condition of a gear lock the timing of the roller clutching action on the driving and driver members is controlled by having a lost motion arrangement between the roller cage 54 and the driving member during an initial reverse braking movement of the driving member to cause the driving teeth 53 to recede a predetermined regular amount relative to the ring gear clutch teeth 67.

The extent of this initial clutch tooth clearance is dependent upon the planetary gear ratios. In the illustrated embodiment the ratios are about 5 to 4 over-drive and 4 to 5 under-drive. Since at the reverse speed condition which applies at the under-drive setting the ring gear teeth would overtake the driving clutch teeth at the rate of 5 to 4, i.e., ¼° per each degree of reverse movement of the driving member 50, the ring gear teeth are overtaking the driving clutch teeth at the rate of ¼° per each degree of reverse movement of the driving member clutch teeth. If there is a reverse lost motion of the driving member relative to the planetary system, for example of 15°, before the driven member begins to act upon the planetary train, it would take 60° of reverse movement of the ring gear before the clutch teeth 67 would overtake the driving member clutch teeth 52. Before such an interference would occur the backlash in the braking mechanism would have been taken up and all reverse movement of the involved elements would be arrested.

It will be seen that two conditions must be met in the control of the extent of the lost motion of the roller cage relative to the driving and driven members. When the planetary setting is for over-drive the driven member is rotating faster than the driving member. Hence the rollers would have a tendency to be driven into clutching position by the faster moving driven member. Accordingly the roller cage must be controlled to maintain the rollers remote from the camming rises 53a of the driving member during this over-drive setting. There must be a lost reverse motion of the driving member before the driving and driven members are roller coupled together to avoid a gear locking condition, as explained. As will be seen, this may be accomplished in several ways. At the over-drive setting, the driving clutch teeth move through a considerable part of a revolution to take up the above provided backlash of about 15° before the driver clutch teeth can engage the planet carrier clutch teeth. We provide a friction disk 68 on the driver side of the carrier structure, the disk 68 having a diameter slightly greater than the outside diameter of the carrier clutch teeth. This friction disk 68, shown annular, is so carried on the planet carrier structure as to be disposed diametrically beneath the roller cage 54. The annular portion 53 of the driving member which supports the cage is cut away to afford clearance for friction shoes attached to the roller cage. These shoes may be in the form of flat spring members 55 which are shaped so as not to interfere with the axial shifting of the planet carrier, but which will bear upon the perimeter of the friction disk member 68 in all three selected positions of the carrier.

The lost motion action takes place as follows—assuming the roller cage is in such position on the part 53 of the driving member with the rollers displaced rearwardly 15° of the cam rises 53a on the driving member, a 15° reverse movement of the driving member will take place relative to the planet carrier since the planet carrier is held stationary relative to the driving member cam rises 53a by reason of the friction shoes 55 acting on the stationary disk 68. Upon roller clutching of the driving and driven members the roller cage is caused to rotate with these members, i.e., in a reverse direction, by reason of the locked or clutched condition of the rollers, and the shoes then slide on the friction disk 68; the roller clutching force thus tending to maintain the rollers in a clutched position despite some backward movement of the disk 68. Upon a forward drive of the driving member, the friction shoes tend to drag on the friction disk 68 until a shoulder or pin 58 on the driving member abuts a shoulder facing shoulder 59 relative to the cam rise 53a, and these shoulders determine the extent of reverse lost motion of the driving member relative to the stationary planet carrier upon commencement of each braking action by the bicycle rider.

The drag of the friction shoes on the roller cage in over-drive setting keeps the rollers retracted from camming position since the planetary cage is moving at a speed which is less than the speed of the driven member 40. During an under-drive setting, the driven member is moving slower than the driving member, a relationship which is adverse to any untimely clutching action of the rollers. Since at no time does a condition exist where the planet carrier would ever be rotated at a speed greater than the driving member in forward direction, and backlash take-up between the clutch teeth follows every braking action release, the roller cage is always returned to its initial relation to the cam rises 53a on the driving member, i.e., with the clutch rollers retained remote from the cam rises, and no adverse condition arises where the driven member is rotating faster than the driving member.

In Figs. 2 and 2-A we show another clutch arrangement in which there is a lost motion connection between the driving member and clutch sleeve. The adverse condition to be met occurs when the driven side is moving faster than the driving side on forward drive to prevent the reverse roller clutch from locking on the driven member.

Upon reverse, for direct braking, the roller cam 53a is on the driving member 50 and the roller cage 54 is loosely mounted for limited movement on the driving member.

The driving member has a forward driving shoulder 112 which drives on an integral lug 111 on a driving clutch sleeve 110 also loosely mounted on the driving member, and there is a flat spring 114 mounted in the cage and reacting on the clutch sleeve 110—thus spanning the driving member by extending through an opening in the driving member.

Upon reverse of the driving member there is a lost motion between the clutch sleeve lug 111 and the driving shoulder 112 on the driving member before reverse clutching is consumated. During this 15° lost motion interval the clutch sleeve (transmission) remains motionless and the spring 114 acting on the clutch sleeve holds the roller cage motionless until the roller cam 53a of the driving member effects the clutched connection between the driving and driven members. The 15° lost motion is to meet a condition which arises when the transmission is at a low speed setting.

As the driving member continues its reverse movement to effect braking the reverse movement of the clutch sleeve lug is ⅘ of the movement of the driving member. Hence the spring is slipped on the clutch sleeve by the movement of the driving member, i.e., the spring drags on the clutch sleeve.

Upon forward movement the reverse clutch is released immediately and the spring drag on the clutch sleeve holds the roller cage while the driving member advances since the transmission is standing idle during this interval.

As the driving member begins to drive the clutch sleeve, the roller cage will have been retracted from the cam rises 53a on the driving member and the driving member, and the roller cage and the clutch sleeve then rotate in unison. If desired a positive lock between cage and driving member could be effected by the closing movement of the driving shoulder 112 upon the clutch sleeve lug 111.

When the foregoing mechanism is considered under a low speed setting of the transmission, which does not involve the danger of untimely clutching since the driving member is moving faster than the driven member, the clutch sleeve lug 111 moves at a reverse speed which is faster than the reverse speed of the driving member, but the driving shoulder 112 has a 15° start and the sleeve lug overtakes the driving shoulder at the rate of ¼° per degree of reverse movement of the driving member. Hence a braking movement of 60° of the driving member is effected before the driving shoulder 112 and sleeve lug 111 could be brought into interference.

There may be two driving shoulders 112 on the driving member and two clutch sleeve lugs 111 spaced 180° apart. There may be three or four clutch rollers in the cage. Hence there could be one or two springs.

The only variation in the lug and spring relationship comparing high speed to low speed actions is to be found in the difference in the extent of relative movement of the driver clutch sleeve lugs 111 to the reverse movement of the driving member shoulder 112.

As the braking mechanism wears, more reverse movement of the driving member will be required. When the maximum allowance for wear is determined, provision in the design therefore can be made. It should be noted that the driving shoulder of the driving member, the clutch sleeve lug face and the cage are always brought into the same definite relation with the rollers held retracted from the cam rises of the driving member; and if need be the roller cage can be locked in this position as long as the driving shoulder is in driving relation to the lug on the clutch sleeve.

As to bearing surfaces—there is only a relative movement of 15° between the driving member and roller cage, and the driving clutch sleeve would not have a relative movement on the driving member of more than 60° plus small increase for coaster brake wear. Thus plain bearing surfaces will suffice. Certainty of clutching cycle is assured and danger of untimely clutching eliminated.

In Figs. 3 and 3-A we show still another arrangement which will accomplish the purposes of the present invention in that the required lost motion between the driving or driven members relative to the transmission gear elements is obtained by having a clutch sleeve arranged on the driven member 40 and a roller clutch construction therefor carried by the driven member. In this construction the driven member becomes a roller cage for a set of forward and a set of reverse clutch rollers which act upon a cam ring which is alternately roller-clutch connected to the driven clutch sleeve during forward drive and to the driving and driven members during reverse braking movement of the driving member.

Referring to Figs. 3 and 3-A, a cam ring 150 is mounted on bearings 151 and 152 respectively supported by the driving member 50 and the driven member 40. The driven member has a roller cage cylindrical formation 43a extending in overlapping relation to the portion 53 of the driving member 50. It will be noted that the clutch teeth 52 on the driving side are integral with the driving member and that the clutch teeth 42 are on a driven clutch sleeve 154 carried by the driven member 40. A set of clutching rollers 155 disposed in radial openings in the part 43a of the driven member extend into clutching cam formations 156 formed in the cam ring 150. When the clutch sleeve 154 is driven in a forward direction, the action of the cam formations 156 thereby effect coupling of the driven clutch sleeve 154 to the driven member 40. A second set of clutching rollers 160 are carried by the portion 43a of the driven member in radial alignment with cam formations 161 in the cam ring 150; whereby upon reverse movement of the driving member, driver portion 53 will be coupled to the driven portion 43a of the driven member 40. Since the cam formations 156 and 161 can be arranged to determine the relative extent of movement between the cam ring 150 and the part 43a of the driven member 40, the driving and driven cam spacings may be such that the reverse clutch rollers 160 can never be effective in clutching action while the forward drive clutch rollers 155 are effective.

To effect the required limited relative movement between the cam ring 150 and the driven part 43a of the driven member, a flat drag spring 165 may be interposed in any suitable manner between the driven clutch sleeve 154 and the cam ring.

In each of the disclosed embodiments it will be noted that a lost motion provision is made whereby either the driving member or the driven member may remain in coupled relation to the elements of the speed change mechanism and that this lost motion can be provided for at any point in the line of torque transmission to be effective upon a reverse or braking movement of the driving and driven members. For instance a roller clutch connection could be located within a hub of the planets of the gear system in which event the planet gears would be compounded relative to sun gear and ring gear, but such an arrangement would involve increasing the overall axial dimension of the transmission system.

In the construction shown in Figs. 4, 4–A and 4–B of the drawings, a double roller clutch arrangement is located at the driving side of the transmission with one of the roller clutches serving to connect and disconnect the driving member 50 from the transmission mechanism, while the other roller clutch mechanism serves to connect the driving member to the output member 40 upon reverse movement of the driving member. In this construction the roller cage of the reverse clutch mechanism is carried on part of the driving member and the roller cage also serves as a roller camming ring to lock the forward drive clutch rollers to the driving clutch sleeve. The arrangement of the two sets of clutch rollers is such that when one set is in clutched position the other set has to be in unclutching position. In forward drive the clutch rollers 120 are acted upon by the driving member 50 to thrust these rollers into driving engagement with the roller clutch sleeve 121 by reason of the cam formation 122 on the inner side of the roller ring 124. The clutch rollers 120 are disposed in openings formed in the part 53 of the driving member 50 which part, while driving the rollers, also serves as a roller cage. It will be noted that the extent of relative movement between the driving member and the roller ring 124 is determined by the terminal shoulders of the cam formations 122.

To effect coupling of the driven member 40 and the driving member 50 upon reverse movement of the driving member, cam rises 53a on the part 53 of the driving member wedge the reverse clutching rollers 127 into engagement with the part of the driven member which overlaps the driving member. Since the position of the driving clutch rollers 120 have a predetermined fixed relation to the cam rises 53a on the driving member, it is obvious that at no time can opposing forces be exerted on the elements of the planetary transmission system—even though the driven member 40 is in a driving relation thereto—during the reverse or braking effort of the driving member 50.

To restrain the roller clutch and camming ring 124, a flat spring 130 may be mounted on the ring to extend inwardly through an opening in the driver part 53 and press upon the clutch sleeve 121. It will be noted that in this arrangement the particular position of the clutch sleeve teeth 52 at the termination of a reverse driving of the transmission elements, upon resumption of forward driving can be disregarded since the forward driving clutch 120—122 locks upon the driving clutch sleeve regardless of its reversely rotated position. In this arrangement, under a forward drive low speed setting, the driver clutch sleeve upon a reverse braking action of the driving member will be rotated reversely at a rate of speed which is greater than the reverse movement of the driving member, but the backlash between the clutch teeth of both the driving and driven sides of the transmission mechanism will be sufficient to permit of effective reverse roller clutching of the driving and driven members before any over running influence of the driver clutch sleeve through the spring 130 would take place. Once the clutching becomes effective, the reverse or braking effort of the driving member upon the driven member will greatly exceed the over running influence of the driver clutch sleeve.

Under a direct speed setting of the transmission, the driver clutch sleeve will reversely rotate at the same speed as the driving member but the spring 130 will be effective during the reverse backlash space take up, indicated at 131, to effect relative displacement between the roller cage or ring and the driving member. During a forward over-speed setting of the transmission, the driver clutch sleeve 121 reversely rotates slower than the driving member and the roller cage lag is assured. Under any of the selected speed settings including the over-speed setting of the transmission, it is mechanically impossible for the driving member to become clutched to the driven member when both of the tooth clutches of the transmission are under torque transmitting stress. Figs. 4–A and 4–B respectively show the parts in forward and reverse drive relations.

In the construction shown in Figs. 5, 5–A and 5–B, we show an arrangement generally as shown in Fig. 4, but we have located the roller cams of the forward driving clutch on the driving member thereby to obtain a better clutching action on the driving clutch sleeve 121. In this construction cam portions 53b are formed on the part 53 of the driving member 50 to bear upon the forward driving clutch rollers 120, and the inner surface of the reverse roller cage 124 has cut out arcuate cavities receiving external lugs on the driving member whereby limited relative movement between the cage structure and the driving member is permitted. The cage structure has a depending flange 124a carrying pins 170 which extend into the roller cavities of the cam structure of the driving member for a purpose to be described. The reverse clutching mechanism is the same as hereinbefore described and comprises the roller cam rises 53a on the driving member and the rollers 129 restricted by the cage 124. A retarding spring 130 mounted on the cage structure extends through an opening formed in the part 53 of the driving member and bears upon the circumference of the clutch sleeve 121.

The action of this clutching arrangement is as follows— in forward drive the rollers 120 are forced into clutching engagement by the driver cam portions 53b and the reverse clutch rollers 129 are held remote from the cam rises 53a by the restraining influence of the cage structure.

Upon a reverse movement of the driving member, the cage is restrained in its movement and the pins 170 on the cage displace the forward drive rollers to a nonclutching position within the cam cavities of the driver member as indicated by the dot and dash lines in Fig. 5–B at "d." The relative displacement between the cage and the driving member permits the reverse cam rises 53a to clutch the driven member 40 to the driving member.

A continuation of the reverse movement of the driving member and the driven member causes the driven member to drive the driving clutch sleeve 121, but since the forward clutching rollers 120 are held out of clutching position, no coordination of the reverse movements of the driving member and driving sleeve is necessary regardless of the speed setting of the transmission mechanism.

Upon a resumption of forward driving movement of the driving member, relative displacement between the roller cage and driving member takes place and the reverse clutch rollers 120 are displaced from the cam rises 53b. When the backlash 131 between the teeth of the clutch sleeve 121 and the transmission members is taken up, resistance of the transmission assures a firm clutching action of the rollers 120 upon the sleeve 121.

Apart from the restraining influence of the spring 130 upon reverse movement, should the driving rollers 120 resist disengagement, the entire transmission including the driven member 40 would be driven in a reverse direction until braking resistance is encountered, whereupon reverse clutching would follow to take up the major braking action. It will be apparent that the angular spacing of the cage pins 170 and the caged position of the reverse rollers 129 should be such as to permit of the sequential clutching functions of the two sets of rollers to take place, but at no time to permit the rollers 129 to engage the driven member when the rollers 120 are engaged in forward drive. It follows that the angular spacing of the two sets of cams on the driving member will be in a fixed angular relationship under all conditions of operation.

It will be noted that the various disclosed mechanisms hereinbefore described have one or more clutch mechanisms arranged or located diametrically beyond the outer circumferences of the shiftable planetary system, thus adding substantially to the overall outer diameter of the transmission device and the housing portion of the rear wheel hub structure. We find that if a clutching mechanism between the driving and driven members is arranged radially inwardly of the tooth clutching elements of the planetary system, a very substantial reduction in the required overall diameter of the transmission and hub will be obtained.

In Figs. 6 and 6–A to 6–D inclusive, we show such an arrangement in the form of roller clutches, certain elements of which are directly connected by rigid members which extend in parallel relation to the axle through the relatively shiftable planet cage structure. The sequence of operation of the clutches is such that reverse clutching of the driving and driven members is effected, and the braking action of the driven member is completed, within the angular backlash clearance present between the planetary splines or clutch teeth and the co-acting clutch teeth on the driving and driven members when eight splines or clutch teeth are used. Such a clearance is about 25°. During this reverse movement of 25° the planet cage remains stationary.

In Fig. 6 of the drawings, we show an inner disposition of the clutch mechanisms in the form of a clutch ring 200 disposed in a counterbore formed in the driving member 50. The clutch ring 200 is connected to a second clutch ring 201 disposed in like manner relative to the driven member 40. These two clutch rings are rigidly connected to three equi-angularly spaced round bars 202 in any suitable manner such as counterboring and riveting as shown. The bars 202 extend in a sliding fit through openings 203 formed in the planet cage disks or plates 63a.

The outer circumference of the ring 200 is a clutch cylinder and the counterbore of the driving member 50 has roller cam formations 205 for reverse clutching action on rollers 206. A roller cage 204 serves to maintain the rollers properly positioned to effect coupling of the driving member 50 to the ring 200 upon reverse movement of the driving member. Thus the opposite ring 201 becomes coupled to the driving member by reason of the rigid bars 202. The ring 201 has roller cam formations 209 formed in the cylindrical perimeter thereof to act on clutch rollers 208 disposed between the cam formations 209 and the cylindrical face of the counterbore in the driven member 40, so that a braking or reverse movement of the driving member during initial movement effects a clutched or coupled relationship of the driving and driven members. A roller cage structure 207 serves to maintain the rollers 208 positioned for proper clutching action.

As stated, in this form there are eight splines or transmission clutch teeth 52—42 formed on the driving and driven members respectively and eight teeth or splines 66 on the perimeter of the planet cage structure 36a and the ring gear 64. The structure of the tooth span is about 10° thus leaving a backlash clearance of at least 25° in which the clutch teeth on the driving and driven members can be rotated reversely while the planetary system remains axially stationary regardless of the particular selected speed setting of the planetary system.

In Fig. 6 we also show a roller clutch mechanism generally indicated at 215, and a cam actuated brake means generally indicated at 220 for effecting expansion of the split brake cylinder 225 in lieu of the screw actuated brake mechanism with cone clutch shown in Fig. 1. We find that considerably less reverse braking motion of the driving member is required to effect braking by use of the brake mechanism shown in Fig. 6 and that this braking action will be effected well within the allowable backlash clearance of 25°. Should it be desired, however, to use a brake mechanism requiring more reverse movement of the driving member, a toothed clutch sleeve allowing for additional lost motion could be used on the driving member in the manner hereinbefore disclosed, for example, with respect to the construction shown in Fig. 2.

The driven member 40, in place of the brake actuating screw of previously described figures, includes an axial extension 216 projecting into the inner end of the cylindrical inner hub element 22a to provide camming surfaces 217 (see Fig. 6–C) for urging rollers 218 into a clutching bearing relation with the inner surface of hub element 22a, the shape of cam surfaces 217 being of course sloped so that the roller clutch 215 comprised of these elements engages upon forward rotation of driven member 40 to drive the bicycle wheel, and releases on reversal of 40.

The brake 220 includes an anchor arm 29 and a bearing member 28a generally arranged as described for previous forms, the shoulder 27 being provided by a diametrically extending projection 27a on the inner face of member 28a; a cylindrical brake shoe member 20a expansible against hub element 22a, having an end notch at one side for engagement with projection 27a and a slightly helical slot 221 displaced substantially 180° from projection 27a to permit shoe expansion; a cam element 222 rotatably supported on axle 25 by bearing sleeve 223; and rollers 224 maintained in spaced relation by a cage 225 having at one end, adjacent projection 27a, an inward radial flange for coaxial support of the cage on a cylindrical end surface of cam element 222. The cam member 222 has camming formations 226 shaped (see Fig. 6–D) to move rollers 224 outwardly on reverse movement (counter-clockwise in Fig. 6–D) to expand the shoe into braking contact with the hub. At its inner end, cam member 222 carries a cage type structure including spaced projections 222a (see Fig. 6–C) between the rollers 218 of clutch 215, so that upon reverse movement of 216 on member 40, when rollers 218 are engaged by radial elements 217a between the clutch cam formations 217, the rollers 218 drive member 222 reversely to effect braking. Expansion slot 221 may be of long pitch helical shape, i.e., slightly divergent from longitudinal to avoid engagement and damage by an expanding roller 224 in braking, with the circumferential extent such that the slot cannot be bridged by two rollers. To the same end a longitudinally directed slot may be used having a rectangular lateral excursion 221a at the mid-portion thereof providing a tongue extending from one side of the slot into a corresponding space on the other to prevent a roller entering the slot. (See Fig. 8.)

In the shipper structure of Fig. 6, the axle aperture of member 40 is counterbored to receive a compression spring 227 disposed about the axle 25 to bear against the sun gear 41 and react on a washer 227a supported by an axle shoulder, the spring serving to shift the planetary cage 60 to the right. The planetary cage is shifted to the left against the spring by thrust of a rod 73 bearing upon bar 70 disposed in the diametric axle slot 71 to engage end slots 72 of the sun gear, thereby also serving to key the sun gear against rotation to the axle 25 similarly to previously described forms. A central portion of the bar 70 extends into the sun gear bore beyond the end notches to prevent lateral escape thereof from position.

On the right end of axle 25 there is mounted a device for converting the rectilinear motion, say of a pull rod or flexible enclosed cable, directed at right angles to the axle into an inward motion of shipper rod 73. This device comprises a body 228 threaded onto the end of axle 25 and supporting a headed extension of rod 73, preferably as here a separate headed pin 73a with shank bearing endwise against rod 73, and pin camming lever link means 229 including a camming lever extending through and pivoted in a lateral body slot to have the rounded cam end thereof bear on the head of 73a and the outer end pivoted in the slotted end of a pull rod or cable anchor screw. The body 228 is preferably held in adjusted position by a lock nut as shown. With such arrangement the pull rod attached to means 229 must of course include some means, such as a detent arrangement, whereby the rod is locked in positions corresponding to the three selectable transmission positions. Hence the transmission is shifted positively to the left by a pull rod or cable movement outward away from the axle, while the spring effects the rightward shift as allowed by inward pull cable movement.

To facilitate assembly and servicing of the entire mechanism the spacing and size of the various elements may be so chosen that the roller slots of the various roller retainers or cages may be machined to provide suitably located lips to keep the rollers in place within the cages. Where desired, similar structure may be used with the roller cage elements of the previously described mechanism. Also the cylindrical end portion of cam element 222 may be grooved to receive a split ring engaging the outer face of the end flange of cage 225 to retain the latter and its rollers on cam element 222.

The mechanism of Fig. 6 is shown in that figure with the gear transmission in an axially central position relative to the driving member 50 and driven member 40 in clutched engagement with the ring gear 64. This is the direct drive setting of the transmission and the respective gears, planet carrier and roller clutch mechanisms 200—201 are subject to no torque effort. When the driving member 50 is reversed for a braking action in this direct drive position, the driven member 40 is roller clutched by the driven part 216 and clutch rollers 218 to the hub sleeve 22a.

Upon reverse clutching together of the driving and driven members by clutch rollers 205, 208, rings 200 and 201 and rods 202, the brake mechanism is operated to expand the split brake sleeve 220 against the hub sleeve 22a. The free wheeling clutch rollers 218 are inactive relative to the hub under the above conditions and are approximately in the position shown in Fig. 6–C whereby the driven part 216 turns the cage 215 to expand the brake shoe 220. The spacing between the clutch teeth of driving member and ring gear is such that a lost motion is provided which permits operation of the brake mechanism plus wear of the brake mechanism without a gear lock taking place. The lost motion in the spline connections is provided as hereinbefore explained; and by reducing the sets of spline teeth 42, 52, and 66 of the members to eight, a greater lost motion is obtained when the spline or clutch tooth span remains 10°.

In Fig. 8 the mechanism of Fig. 6 appears in modified form, the outstanding difference being that the inner central portion of the driven member 40 is cut back to permit a drag spring member 207a secured to and extending inward from roller cage 207 to bear upon the cylindrical periphery of a stationary member 227b having an end flange pressed and frictionally held against the shoulder on the axle by the inner end of spring 227. One or more drag spring arms may be used. The member 227b may also serve both as a cover for spring 227 and as a stop for limiting the inward axial shift of the sun gear-planetary carrier unit to overdrive position. Such drag spring arrangement on cage 207 insures against any possibility of engagement of clutch rollers 208 even under unusual conditions, since the retarded roller cage 207 keeps the rollers retracted in the low parts of the cam surfaces of member 201.

The roller cage 208 may have an end flange extended radially inwardly on the side toward the planetary carrier, while its opposite end may be closed by a drag spring member having the form of a ring secured to and closing the roller spaces with inwardly extending arms bearing upon the stationary member 227b.

At the left end of the brake a spring washer member 223a centered on the axle is provided with a plurality of spring fingers or prongs dragging on the brake roller cage 225 to keep the brake rollers retracted to the low cam spots during forward drive, the washer being engaged against rotation by a lug inward of the brake shoe engaging extension 27a on the bearing cone member 28a. Preferably the prongs of the washer 223a are extended longitudinally over the end of the brake cage 225, the end being reduced in diameter to accommodate the prongs without interference with the surrounding brake shoe member. The aperture of the washer is preferably circumferentially flanged for added supporting area at the axle. Accordingly the cam member 222 is counterbored at the left end to clear the spring washer flange. To aid assembly the roller spaces in the cage 225 may be cut directly inwardly from the right side and the rollers may be located endwise between the adjacent shoulder of the cam member and the inner end of the roller slots, since the roller cage is retained by a split ring at the left end of the cam member.

The roller cage 204a may here have the roller slots cut inwardly from the right end with the end being closed by a flat ring 204b having spaced axially directed lugs extended inwardly into cage recesses between the member 200 and the cage 204a to hold the latter in position, an inward cage lip against the left side of the member 200 providing a guaging surface.

A still further form of clutch construction having the merit of restricted diameter is shown in Figs. 7 and 7–A of the drawings. Here the required lost motion between the usual planetary system and the driving member is obtained by the use of the toothed clutch sleeve 230 in the driving member 50. This sleeve member 230 comprises also a bearing race 231 for the bearing balls 232 which are disposed between the driving and driven sides of the mechanism. The sleeve member 230 also comprises a second clutch having a set of teeth 234 engaged by a set of internal teeth 239 formed on an axially shiftable clutch band or cylinder 235. The inner edge of the clutch cylinder 235 has clutch teeth 236 which engage a like set of clutch teeth 237 formed on the driven member 40.

Axial movement of the clutch member 235, upon reverse movement of the driving member 50 upon which it is carried, is effected by cam pins 240 rigidly mounted on the driving member 50 which extend into helical cam slots 238 formed in the clutch cylinder 235. Upon a reverse movement of the driving member 50, the clutch teeth between the clutch cylinder 235 and the clutch teeth on the sleeve member 230 tend to cam apart or separate, since the planetary system and the sleeve 230 tend to remain stationary. Hence the cam helix 238 should conform to the slope of the clutch teeth 239.

As the clutch cylinder 235 is shifted to an uncoupled position relative to the driving member, a drag spring (not shown) may be disposed between the sleeve structure 230 and member 235 to maintain the relative camming movement between the driving member and the clutch sleeve, whereby the latter will be brought into engagement with the clutch teeth 237 on the driven member. The transmission of torque effort from the driving member 50 to the clutch ring 235 is attained through the pins 240 abutting the ends of the helical slot 238. It will be noted that this arrangement is conducive to compact design and that at no time can the order of clutch functioning get out of step in either a forward drive or a reverse drive at any setting of the transmission.

It will be noted in the several forms of the description shown that the mechanisms of Figs. 2, 4, 5 and 7 each include a driving clutch sleeve for transmitting the forward driving action of the driving member to a selected member of the planetary system. The mechansims of Figs. 1 and 6 are such that both the driver clutch teeth and the driven clutch teeth are integral with the driving and the driven members respectively. The mechanism of Fig. 3 has driven clutch teeth which are on a clutch sleeve carried by the driven member. While each mechanism has certain mechanical advantages over the others, the mechanisms of Figs. 6 and 7 are more susceptible to designs of minimum diameters.

While we have shown the several arrangements of elements for fulfilling the stated purposes in combination with a planetary type of change speed transmission, it will be noted that in all instances the braking torque effort is transmitted directly from the driving element to the driven or brake operating element directly and independently of any of the elements comprising the change speed gears per se. To those skilled in the art it will be evident that the invention is adaptable readily to other forms of change speed gearing when it is desired to protect the gear elements from the braking torque efforts. Thus in a gear train wherein compound gears are utilized it is possible to incorporate a roller clutch connection between two of the gears which is releasable upon a reverse drive of the transmission upon braking action thereby preventing exertion of braking stresses upon the gears.

To those experienced in the art it will be apparent that the advantage inherent in the use of a selective speed change unit wherein all braking effort is mechanically by-passed around the speed change gears is that of durability against abuse when the bicycle rider stands on the pedals during braking action. This is a feature highly desired regardless of the type of selective speed change gearing to be used.

The disclosed arrangements are all susceptible to economic manufacture and the compactness thereof, particularly when a planetary gear system is used, permits the conversion of bicycles in use to a speed change type by simply substituting one rear wheel assembly for the other and attaching the gear shipper control to the bicycle frame.

We claim:

1. In a bicycle speed change mechanism the combination of a coaster brake mechanism, a selective gear transmission mechanism, a driving member, a transmission driven member, a lost motion connecting means between the said transmission mechanism and one of said members and an automatically operable clutch mechanism effective upon a reverse driving action of the driving member for coupling the driving member directly to the driven member thereby to operate the brake mechanism independently of movement of the gears of the transmission mechanism.

2. In a bicycle speed change mechanism the combination of a coaster brake mechanism, a selective gear transmission mechanism, an input element, an output element, an automatically operable clutch mechanism effective upon a reverse driving action of the input element for coupling the input element directly to the output element thereby to operate the brake mechanism independently of the gears of the transmission mechanism, said clutch mechanism including a lost motion connection between one of said elements and the transmission mechanism.

3. In a bicycle speed change mechanism the combination of a coaster brake mechanism, a three speed selective gear transmission mechanism, a driving member, a brake operating driven member, a lost motion connection between one of said members and the transmission mechanism, an automatically operable roller clutch mechanism effective upon a reverse driving action of the driving member for coupling the driving member to the driven member thereby to operate the brake mechanism independently of movement of the gears of the transmission mechanism.

4. In a bicycle three speed change mechanism the combination of a coaster brake mechanism, a selective gear transmission mechanism, a brake operating input element, an output element, said elements being coupled to the transmission mechanism, and an automatically operable clutch mechanism effective upon a reverse braking action of the input element for coupling the input element to the output element thereby to operate the brake mechanism independently of movement of the gears of the transmission mechanism and one of said elements having a reverse lost motion connection with the transmission mechanism.

5. In a bicycle three speed change mechanism the combination of a coaster brake mechanism, a three speed selective gear transmission mechanism, a driving element, a driven element, said elements being connected to the transmission mechanism with a lost motion provision between one of the elements and the transmission mechanism, said driven element comprising a coaster brake actuating means, said elements being coupled to the transmission mechanism, and a clutch mechanism for effecting a connection directly between the driving and the driven elements upon a reverse movement of the driving element.

6. In a bicycle three speed change mechanism the combination of a three speed coaster brake mechanism and a selective gear transmission mechanism, a driving element, a driven element, said driven element comprising a coaster brake actuating means, a clutch mechanism for effecting a connection directly between the driving and the driven element upon a reverse movement of the driving element and a lost motion connecting means operatively disposed between one of said elements and the transmission mechanism whereby the driving element may be clutched to the driven element while said elements remain in a transmission connecting position.

7. In a bicycle three speed change mechanism the combination of a coaster brake mechanism, a selective gear transmission mechanism, a driving element, a driven element, said driven element comprising a coaster brake actuating means, clutch mechanism for effecting a connection directly between the driving and the driven element upon a reverse movement of the driving element and a lost motion connecting means between one of said elements and the transmission mechanism, said transmission mechanism comprising a planetary gear system.

8. In a bicycle three speed change mechanism the combination of a coaster brake mechanism, a three speed selective planetary gear transmission mechanism, a driving element, a driven element, said elements being adapted to be selectively connected alternately to the planet carrier and the ring gear of the transmission, said driven element comprising a coaster brake actuating means and a reverse clutch mechanism for effecting a connection directly between the driving and the driven element upon a reverse movement of the driving element irrespective of the connected relationship of the driving and driven elements with the transmission mechanism.

9. In a bicycle speed change mechanism the combination of a coaster brake mechanism, a planetary gear transmission mechanism, an input element, an output element comprising a brake operating means, said planetary gear system being axially shiftable relative to the input element and to the output element thereby to selectively alternately connect the ring gear of the planetary mechanism to said input and output elements, a roller clutch mechanism for directly connecting the input element to the output element, and a lost motion connection between one of said elements and the transmission mechanism whereby the braking torque effort may be applied to the output element without passing through the transmission mechanism.

10. In a bicycle speed change mechanism the combination of a coaster brake mechanism, a planetary gear transmission mechanism, an input element, an output element comprising a brake operating means, said planetary gear mechanism being axially shiftable relative to the input element and to the output element thereby to selectively alternately connect the ring gear of the planetary mechanism to said input and to said output elements, a roller clutch mechanism for directly connecting the input element to the output element whereby the braking torque effort may be applied to the output element without passing the transmission mechanism, said roller clutch mechanism including a roller cage loosely carried by the input element.

11. In a bicycle speed change mechanism the combination of a coaster brake mechanism, a planetary gear transmission system, an input means and an output means comprising a brake operating means, said planetary gear system being axially shiftable relative to the input means and to the output means, one of the two last said means including a loose clutch tooth formation and the other of the last said means including a rigid clutch tooth formation thereby to afford a selective alternate connection with the ring gear of the planetary system to said input means and to said output means, a roller clutch mechanism for directly connecting the input means to the output means, a lost motion connection between one of said clutch tooth formation and the transmission system whereby a braking torque effort may be applied to the output means without passing through the said clutch tooth formations.

12. In a bicycle speed change mechanism adapted to be coupled to a coaster brake mechanism, the combination of a selective speed transmission mechanism including a chain driven input member and an output member comprising a coaster brake operating means, a clutch mechanism operable upon a reverse movement of the input member for clutching the input member to the output member, said transmission mechanism comprising a shiftable planet carrier, a non-rotating sun gear, planet gears and a ring gear carried by the carrier, a driving clutch means for coupling the input member to the planetary system, a driven clutch means for coupling the planetary system to the output member, one of said clutch means having a lost motion connection in the system, whereby an axial shifting of the carrier will effect a transmission connection between the driving input member and the carrier while establishing a transmission connection between the ring gear and the driven output member in one selected position and a connection between the input member and the ring gear while establishing a connection between the carrier and the output member.

13. In a bicycle speed change mechanism adapted to be coupled to a coaster brake mechanism, the combination of a selective speed transmission mechanism, a chain driven input member, an output member comprising a coaster brake operating means, a clutch mechanism operable upon a reverse movement of the input member for clutching the input member to the output member, said transmission mechanism comprising as a planetary system a shiftable planet carrier, a non-rotating sun gear, planet gears and a ring gear carried by the carrier, a driving clutch means for coupling the input member to the planetary system, a driven clutch means for coupling the output member to the planetary system whereby an axial shifting of the carrier will effect a transmission connection between the driving input member and the carrier while establishing a transmission connection between the ring gear and the driven output member in one selected position and a connection between the input member and the ring gear while establishing a connection between the carrier and the output member, said last named connection having a lost motion upon reverse movement of the input member, said first named clutch mechanism being operable to connect the input member to the output member thereby to operate the coaster brake irrespective of the existing connections between the ring gear and carrier with said input and output members.

14. In a bicycle speed change mechanism the combination of a coaster brake mechanism, a selective gear transmission mechanism, a driving and driven member, and an automatically operable roller clutch mechanism effective upon a reverse driving action of the transmission mechanism for coupling the driving member to the driven member thereby to operate the brake mechanism independently of movement of the gears of the transmission mechanism and including a forward drive roller clutch mechanism disposed between the driving member and the selective gear mechanism.

15. In a bicycle speed change mechanism the combination of a coaster brake mechanism, an input element, an output element, a selective gear transmission mechanism, an automatically operable clutch mechanism effective upon a reverse driving action of the input element for coupling the input element to the output element thereby to operate the brake mechanism independently of said clutch mechanism and a lost motion roller clutch mechanism between the input element and the transmission mechanism.

16. In a bicycle speed change mechanism the combination of a coaster brake mechanism, a selective gear transmission mechanism, a driving member, a brake operating driven member, an automatically operable roller clutch mechanism effective upon a reverse driving action of the driving member for coupling the driving member to the driven member thereby to operate the brake mechanism independently of movement of the gears of the transmission mechanism.

17. In a selective three speed bicycle gear transmission system wherein an input element and an output element remain operatively disposed for connection to the transmission elements of the system in all selected forward drive conditions of operation, a clutch mechanism for directly connecting the input element to the output element including a cam ring disposed between said elements, and a lost motion connection between one of said elements and the gear system effective upon a reverse movement of the input element and said cam ring being clutchable to the input element upon said reverse movement.

18. In a selective three speed bicycle planetary gear transmission system wherein an input element and an output element remain operatively disposed for connection to the transmission elements of the system through axially shiftable clutch connections in all selected forward drive conditions of operation, a roller clutch mechanism for directly connecting the input element to the output element upon reverse movement of the input element and including a lost motion roller clutch connection between one of said elements and the gear system effective upon a reverse movement of the input element.

19. In a selective three speed bicycle gear transmission system wherein an input element and an output element remain operatively disposed for connection to the transmission elements of the system in all selected forward drive conditions of operation, a clutch mechanism effective upon a reverse movement of the input element to connect the input element to the output element and a second clutch mechanism disposed in the line of transmission from the input element to the output element for rendering ineffective the driving relation of the input element to the said line of transmission upon a reverse movement of the input element.

20. In a speed change mechanism for bicycles, speed change gearing, a driving element for the gearing, a driven element, clutch means between the driving element and the gearing and between the driven element and the gearing whereby speed change settings may be effected, said clutch means providing a lost motion connection between one of said elements and the gearing, and a clutch mechanism effective upon a reverse driving movement of the driving element to connect the two elements directly together whereby the said clutch means may remain in engagement with the gearing of the speed change mechanism.

21. In a three speed change mechanism for bicycles, speed change planetary gearing, a driving element for the gearing, an element driven by the gearing, clutch means between the driving element and the gearing and between the driven element and the gearing whereby speed change settings may be effected and said clutch means providing a lost motion connection between said driving element and the gearing and a clutch mechanism effective upon a reverse driving movement of the driving element to connect the two elements directly together whereby the said clutch means may remain in engagement with the gearing during a reverse coupled movement of the driving and driven elements.

22. In a three speed change mechanism for bicycles, a planetary speed change gear system, a driving element for the gear system, an element driven by the gears, separate clutch means between the driving element and the gear system and between the driven element and the gear system whereby speed change settings may be effected, a lost motion mechanism arranged between said driven element and its clutch means and a separate clutch mechanism effective upon a reverse driving movement of the driving element to connect the two elements directly together whereby the respective driven and driving clutch means may remain in engagement with elements of the speed change system without a gear lock when the driving and driven elements are reversely coupled together by said other clutch mechanism.

23. In a three speed change mechanism for bicycles, speed change gears, a driving element for the gears, a driven element, clutch means between the driving element and the gears and between the driven element and the gears whereby speed change settings may be effected, a lost motion mechanism disposed between one of said elements and the speed change gears and a clutch mechanism effective upon a reverse driving movement of the driving element to connect the two elements directly together, whereby the said clutch means may remain in engagement with the speed change gears during a reverse movement of the driving element.

24. In a bicycle speed change mechanism adapted to be coupled to a coaster brake mechanism, the combination of a selective three speed transmission mechanism, an input member, an output member comprising a coaster brake operating means, a clutch mechanism operable upon a reverse movement of the input member for clutching the input member to the output member, said transmission mechanism comprising as a planetary system a shiftable planet carrier, a non-rotating sun gear, planet gears and a ring gear carried by the carrier, a driving clutch means for coupling the driving member to the planetary system, a driven clutch means for coupling the output member to the planetary system whereby an axial shifting of the carrier will effect a transmission connection between the driving clutch means and the carrier while establishing a transmission connection between the ring gear and the driven clutch means in one selected position and a connection between the driving clutch means and the ring gear while establishing a connection between the carrier and the driven clutch means, and a lost motion connection disposed in the transmission line of connection between the driving and driven members for permitting a reverse driving action of one of said clutch means upon the planetary system while said driving member is reversely coupled directly to the driven member.

25. In a selective three speed bicycle gear transmission system wherein an input element and an output element remain operatively connected to the gear elements of the system in all selected conditions of operation, an automatically operable clutch mechanism for drivingly connecting the input element directly to the output element upon a reverse movement of the input element, a clutch mechanism effective upon forward drive of the input element for driving the transmission system and means operatively extending between clutch elements of the two clutch mechanisms for preventing engagement of one clutch mechanism while the other clutch mechanism is engaged.

26. In a selective speed transmission system for bicycles, an input element, an output element adapted to be connected to the brake actuator of a conventional coaster brake, a speed change gear mechanism, a clutching mechanism for coupling the input element upon a reverse movement of the input element to the output element, a second clutch mechanism for coupling one of said elements to the gear mechanism upon forward movement of the input element and a clutch control means operatively extending between elements of the two clutch mechanisms for preventing engagement of one clutch mechanism while the other clutch mechanism is in engagement.

27. In a selective speed transmission system for bicycles, a chain driven driving member, a coaster brake operating driven member, a change speed gear transmission mechanism interposed between the said two members, a roller clutch mechanism associated with the driving member for clutching the driving member to the driven member thereby to apply torque to the driven member independently of the gear transmission upon a reverse movement of the driving member and a second roller clutch mechanism for connecting the driving member to the gear transmission mechanism upon a forward driving movement of the driving member.

28. In a selective speed transmission system for bicycles, a chain driven driving member, a coaster brake operating driven member, a change speed gear transmission mechanism interposed between the said two members, a roller clutch mechanism associated with the driving member for clutching the driving member to the driven member thereby to apply torque to the driven member independently of the gear transmission upon a reverse movement of the driving member and a second roller clutch mechanism for connecting the driving member to the gear transmission mechanism upon a forward driving movement of the driving member, and means extending from one clutch mechanism to the other clutch mechanism for preventing clutching engagement of the rollers of one clutch mechanism while the rollers of the other clutch mechanism are in clutching engagement.

29. In a bicycle change speed transmission mechanism adapted to the hub of the rear wheel of a bicycle the combination of a driving element, a driven element, a change speed gear mechanism disposed between the two elements and a dual clutching mechanism operable upon a reverse movement of the driving element to disconnect one of said elements from the gear mechanism and to connect the driving element to the driven element.

30. In a three speed transmission mechanism for a bicycle, a driving element, a driven element, gear mechanism disposed transmittingly between the elements, a clutch means operable upon a reverse movement of the driving element for transmittingly connecting the driving element to the driven element independently of the gear elements and a lost motion connection arranged between the driven element and the transmission mechanism permitting reverse actuation of the driven element independently of the transmission mechanism.

31. In a three speed transmission mechanism for a bicycle, a driving element, a driven element, gear mechanism disposed transmittingly between the elements, a clutch means operable upon a reverse movement of the driving element for transmittingly connecting the driving element to the driven element independently of the gear elements, an automatically releasable connecting means between one of said elements and the gear mechanism and a lost motion connection between one of said elements and the gear mechanism.

32. In a bicycle change speed transmission mechanism adapted to the hub of the rear wheel of a bicycle the combination of a driving element, a driven element, a change speed gear mechanism disposed between the two elements and having a lost motion transmission connection releasable upon a reverse driving of the gear mechanism, and a dual clutching mechanism operable upon a reverse movement of the driving element to disconnect one of said elements from the gear mechanism and to connect the driving element to the driven element.

33. In a bicycle speed change and brake mechanism: a driving member, a driven member, a brake operating mechanism connected to the driven member, a planetary gear system including a planet carrier and ring gear having peripheral splines disposed between the driving and driven member to be selectively axially shiftable to effect speed change spline connections with the driving member and with the driven member, said spline connections having provision for lost motion upon a reverse movement of the driving and driven members, and a clutch mechanism extending between the driving and driven members for coupling the driving member to the driven member upon a reverse movement of the driving member, said clutch mechanism including elements extending through the planet carrier of the planetary gear system.

34. In a bicycle speed change and brake mechanism: a driving member, a driven member, a brake operating mechanism connected to the driven member, a planetary gear system including a planet carrier and ring gear having peripheral splines disposed between the driving and driven member to be selectively axially shiftable to effect speed change spline connections with the driving member and with the driven member, said spline connections having provision for lost motion upon a reverse movement of the driving and driven members, and roller clutch mechanisms on the driving and driven members for coupling the driving member to the driven member upon a reverse movement of the driving member, said clutch mechanisms being connected by elements extending through the planet carrier of the planetary gear system while permitting axial movement of the planetary gear system.

35. In a bicycle speed change and brake mechanism: a driving member, a driven member, a brake operating mechanism connected to the driven member, a planetary gear system having spherical splines and disposed between the driving and driven member to be selectively axially shiftable to effect speed change connections with the driving member and with the driven member, and a clutch mechanism between the driving and driven members for coupling the driving member to the driven member upon a reverse movement of the driving member, said clutch mechanism including non-axially movable elements extending through the planet carrier of the planetary gear system.

36. In a bicycle speed change and brake mechanism: a driving member, a driven member, a brake operating mechanism connected to the driven member, a planetary gear system having spherical splines and disposed between the driving and driven member to be selectively axially shiftable to effect speed change spline connections with the driving member and with the driven member, said spline connections having provision for lost motion upon a reverse movement of the driving and driven members, a clutch mechanism on the driving member, a clutch mechanism on the driven member, and means rigidly connecting elements of the two clutch mechanisms for coupling the driving member to the driven member upon a reverse movement of the driving member.

37. In a bicycle speed change and brake mechanism: a driving member, a driven member, a brake operating mechanism connected to the driven member, a planetary gear system including a gear carrier and ring gear associated with the driving and driven member to be selectively axially shiftable to effect speed change connections with the driving member and with the driven member, said connections comprising peripheral splines formed on the carrier and ring gear, and a clutch mechanism extending between the driving and driven members for coupling the driving member to the driven member upon a reverse movement of the driving member, said clutch mechanism including elements extending through the planet carrier of the planetary gear system.

38. In a bicycle speed change and brake mechanism: a driving member, a driven member, a brake operating mechanism connected to the driven member, a planetary gear system including a gear cage and ring gear having peripheral splines formed thereon to be selectively axially shiftable to effect speed change connections with the driving member and with the driven member, and two clutch mechanisms on the driving and driven members for coupling the driving member to the driven member upon a reverse movement of the driving member, said clutch mechanisms including a cage structure combined with the cage structure of the planetary gear system to permit a relative axial movement between the cage structures.

39. In a bicycle speed change and brake mechanism: a driving member, a driven member, a brake operating mechanism connected to the driven member, a planetary gear system disposed between the driving and driven member to be selectively axially shiftable to effect speed change connections with the driving member and with the driven member, and a clutch mechanism adapted to extend between the driving and driven members for coupling the driving member to the driven member upon a reverse movement of the driving member, said clutch mechanism including an axially shiftable clutch member carried on the driving member.

40. In a bicycle speed change and brake mechanism, a driving member, a driven member, a brake operating mechanism connected to the driven member, a speed change transmission system spline connected to the driving and driven members, a clutch mechanism for connecting the driving member directly to the driven member upon a reverse movement of the driving member and including an automatically disconnectable clutch means disposed between the driving member and the transmission system for disconnecting the driving member from the transmission system upon said reverse movement of the driving member, said spline connections having a lost motion between the driving and driven members upon reverse movement of the driving member.

41. In a bicycle speed change and brake mechanism, a driving member, a driven member, a brake operating mechanism connected to the driven member, a speed change transmission system connected to the driving and driven members, a clutch mechanism for connecting the driving member directly to the driven member upon a reverse movement of the driving member, a clutch sleeve connecting the driving member and the transmission mechanism in all settings thereof and an automatically disconnectable clutch means disposed between the driving member and the clutch sleeve for disconnecting the driving member from the transmission system upon said reverse movement of the driving member.

42. In a bicycle speed change and brake mechanism, a driving member, a driven member, a selective change three speed gear mechanism connected to said members by spline formations on the gear mechanism and the driving and driven members, a clutch element carried by one of the said members automatically operable to connect the two members together upon a reverse movement of the driving member, a second clutch element connecting one of said members to the gear mechanism and automatically disconnectable when the driving and driven members are clutched together by the first named clutch element while the driving and driven members remain in splined relation to the gear mechanism with a lost motion between the members and gear mechanism.

43. In a bicycle speed change and brake mechanism, a driving member, a driven member, an axially shiftable selective change speed gear mechanism spline connected to said members, a clutch element carried by one of the said members automatically operable to connect the two members together upon a reverse movement of the driving member, a second clutch element connecting the driving member to the gear mechanism and automatically disconnectable when the driving and driven members are clutched together by the first named clutch element.

44. In a bicycle speed change and brake mechanism, a driving member, a driven member, a selective change speed gear mechanism connected to said members, a clutch element carried by one of the said members having a clutch formation automatically operable to connect the two members together upon a reverse movement of the driving member, a second clutch formation on the clutch element connecting the driving member to the transmission mechanism and automatically disconnectable when the driving and driven members are clutched together by the first named clutch element.

45. In a selective speed and brake operating mechanism for bicycles the combination of a change speed gear transmission means, a driving member and a driven member selectively connected to the gear transmission means, a saw tooth clutch means operatively disposed between the two members including a clutch ring relatively rotatively supported by one of said members and operable to clutch the two members together, said clutch ring also serving to connect its supporting member to the transmission means while being automatically disconnectable upon reverse movement of said supporting member, and camming means disposed between the clutch ring and the supporting member to effect axial movement of the clutch ring thereby to fulfill the stated clutching and unclutching functions.

46. In a selective speed and brake operating mechanism for bicycles the combination of a change speed gear transmission means, a driving member and a driven member selectively connected to the gear transmission means, a saw tooth clutch means operatively disposed between the two members including a clutch ring relatively rotatively supported by one of said members and operable to clutch the two members together, said clutch ring also serving to connect its supporting member to the transmission means while being automatically disconnectable upon reverse movement of said supporting member, camming means disposed between the clutch ring and the supporting member to effect axial movement of the clutch ring thereby to fulfill the stated clutching and unclutching functions, and a drag spring disposed between the change speed transmission means and the clutch ring to insure functioning of the camming means.

47. In a bicycle speed change and brake mechanism, a driving member, a driven member, a brake operating mechanism connected to the driven member, a speed change transmission system connected to the driving and driven members, a duplex clutch mechanism for connecting the driving member directly to the driven member upon a reverse movement of the driving member and including separate clutch means associated with the driving member and automatically disconnectible and the driven member upon a forward drive movement of said members.

48. In a bicycle speed change and brake mechanism, a driving member, a driven member, a brake operating mechanism connected to the driven member, a speed change transmission system spline connected to the driving and driven members, a duplex roller clutch mechanism for connecting the driving member directly to the driven member upon a reverse movement of the driving member and including a roller clutch on the driving member and a roller clutch on the driven member and connecting means extending between the two clutches and extending through the transmission system for transmitting braking torque effort from the driving member to the driven member independently of the speed change transmission system.

49. In a bicycle speed change mechanism adapted to be coupled to a coaster brake mechanism, the combination of a selective speed transmission mechanism including a chain driven input member and an output member comprising the coaster brake operating means, a roller clutch mechanism including a roller cage carried by the input member and operable upon a reverse movement of the input member for clutching the input member to the output member, said roller cage being shiftable relative to the input member, said transmission mechanism comprising as a planetary system an axially shiftable planet carrier, a non-rotating sun gear, planet gears and a ring gear carried by the carrier, a driving clutch means for coupling the driving member to the planetary system, there being a reverse lost motion connection between the input member and said driving clutch means a driven clutch means, for coupling the output member to the planetary system, whereby an axial shifting of the carrier will effect a transmission connection between the driving input member and the carrier while establishing a transmission connection between the ring gear and the driven output member in one selected position and a connection between the input member and the ring gear while establishing a connection between the carrier and the output member, said roller clutch mechanism being operable to connect the input member to the output member while said lost motion connection permits the output member to reversely drive the planetary system.

50. In a planetary transmission for a bicycle including a driving member, a driven member, a planetary carrier journalled by and axially held on a non-rotating sun gear slideably mounted on an axle whereby the carrier and ring gear thereof may be brought into selective engagement with the driving and driven members by axial shifting of the carrier and sun gear as a unit, transmission carrier shipper means operable by a pull rod or cable comprising: an axle for the sun gear having a diametric slot at the shifting locus of the sun gear and a bore extending outward from said slot, spring means interposed between the axle and said unit to bias the unit in one direction, a bar extending diametrically in said slot to bear against one end of the sun gear, headed shipper rod means movable in said bore and bearing against said bar to move the carrier in a direction opposite to the spring bias, and a shipper operating head including a laterally slotted hollow body secured to one end of said axle having a bore aligned with the axle bore and a space to accommodate the headed portion of said rod means, a lever pivoted in and extending laterally through said slot having a rounded inner end bearing on the headed portion of said rod means, and a shipper cable anchor pivoted to the outer end of said lever.

51. In a planetary transmission for a bicycle rear wheel including a driving member, a driven member, a planetary carrier journalled by and axially held on a non-rotating sun gear slideably mounted on an axle whereby the carrier and ring gear thereof may be brought into selective engagement with the driving and driven members by axial shifting of the carrier and sun gear as a unit, transmission carrier shipper means operable by a pull rod or cable comprising: an axle for the sun gear having a diametric slot at the shifting locus of the sun gear and a bore extending outward from said slot, spring means interposed between the axle and said unit to bias the unit in one direction, a bar extending diametrically in said slot to bear against one end of the sun gear, the sun gear having end formations engaged by said bar to hold said gear against rotation, a shipper rod movable in said bore and bearing against said bar to move the carrier in direction opposite to the spring bias, and a shipper operating head including a laterally slotted hollow body adjustably secured to one end of said axle having a bore aligned with the axle bore, a headed pin movable in said body with shank in said bore to thrust against said rod, a lever pivoted in and extending laterally through said slot having a rounded inner end bearing on the head of said pin, and a shipper cable anchor pivoted to the outer end of said lever.

52. In a planetary transmission including a driving member, a driven member, a planetary carrier journalled by and axially held on a non-rotating sun gear slideably mounted on an axle whereby the carrier and ring gear thereof may be brought into selective engagement with the driving and driven members by axial shifting of the carrier and sun gear as a unit, transmission carrier shipper means operable by a pull rod or cable comprising: an axle for the sun gear having a diametric slot at the shifting locus of the sun gear and a bore extending outward from said slot, spring means interposed between the axle and said unit to bias the unit in one direction, a bar extending diametrically in said slot to bear against one end of the sun gear, a shipper rod movable in said bore and bearing against said bar to move the carrier in direction opposite to the spring bias, and a shipper operating head including a laterally slotted hollow body threaded onto one end of said axle having a bore aligned with the axle bore, means locking the body in position on said axle, a headed pin with shank in said bore to thrust against said rod, a lever pivoted in and extending laterally through said slot having a rounded inner end bearing on the head of said pin, and a shipper cable anchor pivoted to the outer end of said lever.

References Cited in the file of this patent

UNITED STATES PATENTS

| | | |
|---|---|---|
| 863,424 | Newton | Aug. 13, 1907 |
| 2,180,527 | Jones | Nov. 21, 1939 |
| 2,609,712 | Hood | Sept. 9, 1952 |

FOREIGN PATENTS

| | | |
|---|---|---|
| 25,414 | Great Britain | Aug. 27, 1908 A.D. 1907 |
| 26,634 | Great Britain | Apr. 12, 1906 A.D. 1905 |
| 208,176 | Germany | Mar. 19, 1909 |
| 503,837 | Belgium | Oct. 10, 1952 |